(12) United States Patent
Taneko et al.

(10) Patent No.: US 11,182,062 B2
(45) Date of Patent: Nov. 23, 2021

(54) TOUCH PANEL DEVICE

(71) Applicant: Mitsubishi Electric Corporation, Tokyo (JP)

(72) Inventors: Jun Taneko, Tokyo (JP); Daisuke Kisara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/963,109

(22) PCT Filed: Jan. 31, 2018

(86) PCT No.: PCT/JP2018/003147
§ 371 (c)(1),
(2) Date: Jul. 17, 2020

(87) PCT Pub. No.: WO2019/150475
PCT Pub. Date: Aug. 8, 2019

(65) Prior Publication Data
US 2021/0124481 A1  Apr. 29, 2021

(51) Int. Cl.
*G06F 3/041* (2006.01)
*G06F 3/0484* (2013.01)

(52) U.S. Cl.
CPC ........ *G06F 3/04847* (2013.01); *G06F 3/0416* (2013.01); *G06F 3/04142* (2019.05)

(58) Field of Classification Search
None
See application file for complete search history.

(56) References Cited

U.S. PATENT DOCUMENTS

| 2008/0202824 A1* | 8/2008 | Philipp | G06F 3/0488 178/18.01 |
| 2010/0083116 A1* | 4/2010 | Akifusa | G06F 3/0488 715/727 |
| 2017/0357400 A1* | 12/2017 | Foster | A01B 69/008 |

FOREIGN PATENT DOCUMENTS

| JP | 10-326172 A | 12/1998 |
| JP | 2006-323492 A | 11/2006 |
| JP | 2015-197884 A | 11/2015 |
| JP | 2017-224195 A | 12/2017 |

\* cited by examiner

*Primary Examiner* — Rinna Yi
(74) *Attorney, Agent, or Firm* — Birch, Stewart, Kolasch Birch, LLP

(57) ABSTRACT

A touch panel device includes a touch panel that changes a state of a region on an operation surface in which a touch operation is performed, a pressure sensor unit to output a pressure detection signal corresponding to a pressing force (Fp) applied to the operation surface, and a controller to calculate coordinates of the touch operation on the operation surface based on the state of the touch panel. In a case that a second touch operation is performed, when a value of the pressing force is greater than a predetermined threshold pressing force (ThF), the controller judges that second operation information corresponding to the second touch operation is valid. In a case that a second touch operation is performed, when the value of the pressing force is less than or equal to the threshold pressing force, the controller judges that the second operation information is invalid.

1 Claim, 28 Drawing Sheets

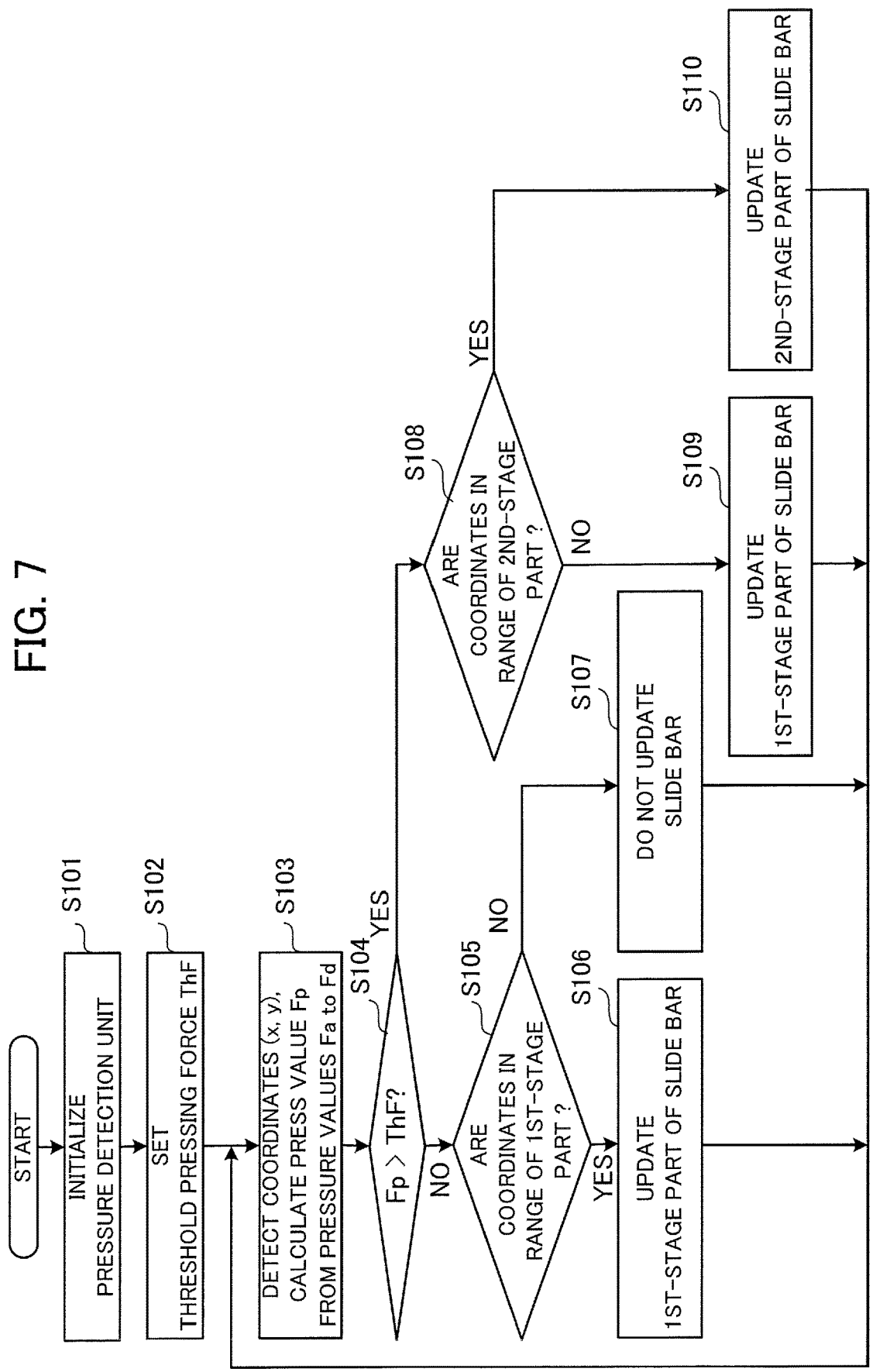

FIRST TOUCH OPERATION

SECOND TOUCH OPERATION

NORMAL INPUT RANGE EXAMPLE
INPUT VALUE: 10 – 100

FIRST TOUCH OPERATION

RESTRICTED INPUT RANGE EXAMPLE
INPUT VALUE: 9 OR LESS OR 101 OR GREATER

SECOND TOUCH OPERATION

FIRST TOUCH OPERATION

SECOND TOUCH OPERATION

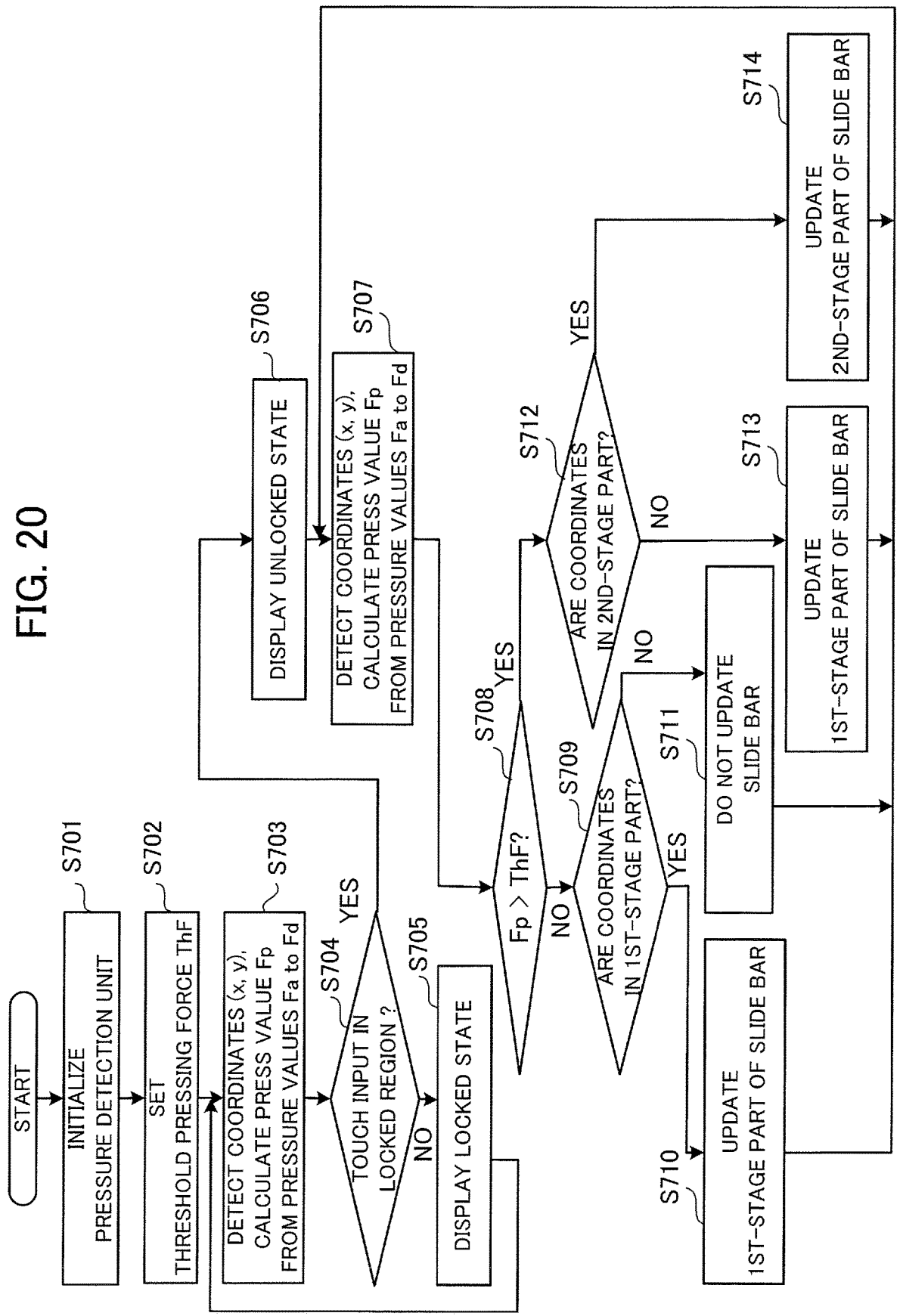

STRONG PRESS WITH FIST 81     SLIDE FIST 81 WITH STRONG PRESS

STRONG PRESS WITH FIST 81     SLIDE FIST 81 PRESCRIBED NUMBER OF TIMES WITH STRONG PRESS

FIRST TOUCH OPERATION　　　SECOND TOUCH OPERATION

FIRST TOUCH OPERATION　　　SECOND TOUCH OPERATION

TOUCH PANEL DEVICE

TECHNICAL FIELD

The present invention relates to a touch panel device including a touch panel.

BACKGROUND ART

There has been proposed a user interface (UI) device on which a slider of a slide bar displayed on a screen is moved along a rail part (i.e., bar part) by a drag operation of swiping the slider with a pen point of an input pen (see Patent Reference 1, for example). On this device, when the movement of the slider is switched from movement in a first-stage rail part to movement in a second-stage rail part, it is necessary to perform an operation of keeping on selecting the slider for a certain time or longer in a boundary region between the rail parts while stopping the drag operation.

PRIOR ART REFERENCE

Patent Reference

Patent Reference 1: Japanese Patent Application Publication No. 2006-323492 (e.g., paragraphs 0024 to 0025 and FIG. 9)

SUMMARY OF THE INVENTION

Problem to be Solved by the Invention

The input to the second-stage rail part on the aforementioned device is a restricted input operation that is permitted after satisfaction of the definite condition of keeping on selecting the slider for a certain time or longer while stopping the drag operation. However, in actual operations, there can occur a situation in which the drag operation in the boundary region is stopped and the aforementioned definite condition is satisfied by accident. Accordingly, there can occur an erroneous operation in which the input operation in the second-stage rail part is permitted (i.e., the restriction is canceled) by accident and the restricted input operation in the second-stage rail part is carried out against the operator's intention.

An object of the present invention, which has been made to resolve the above-described problem with the conventional technology, is to provide a touch panel device capable of avoiding the occurrence of an erroneous operation in which a second touch operation as a restricted input operation is carried out against the operator's intention.

Means for Solving the Problem

A touch panel device according to an aspect of the present invention includes a touch panel that has an operation surface and changes a state of a region on the operation surface in which a touch operation is performed; pressure sensors to output pressure detection signals corresponding to a pressing force applied to the operation surface; and a controller to calculate coordinates of the touch operation on the operation surface based on the state of the touch panel. The touch operation includes a first touch operation using an operation component displayed on the operation surface and a second touch operation using a an operation component displayed on the operation surface. In a case that the first touch operation is performed, the controller judges that first operation information corresponding to the first touch operation is valid. In a case that the second touch operation is performed, when a press value of the pressing force indicated by the pressure detection signals is greater than a predetermined threshold pressing force, the controller judges that second operation information corresponding to the second touch operation is valid. In a case that the second touch operation is performed, when the press value is less than or equal to the threshold pressing force, the controller judges that the second operation information is invalid. The operation component includes a slide bar, the slide bar includes a bar part, a lengthwise direction of which corresponds to an input value, and a slider that moves along the bar part, the bar part includes a first-stage part and a second-stage part, the operation component further includes a fixed region arranged around a position of a boundary value between the first-stage part and the second-stage part, and when the second touch operation is performed by pressing the slider with a pressing force at a press value greater than the threshold pressing force while touching the fixed region, the controller judges that the second operation information corresponding to the second touch operation is valid.

Effect of the Invention

According to the present invention, the occurrence of an erroneous operation in which the second touch operation as a restricted input operation is carried out against the operator's intention can be avoided.

BRIEF DESCRIPTION OF THE DRAWINGS

FIG. 7 is a flowchart showing the operation of the touch panel device according to the first embodiment.

FIG. 20 is a flowchart showing the operation of the touch panel device according to the seventh embodiment.

MODE FOR CARRYING OUT THE INVENTION

Touch panel devices according to embodiments of the present invention will be described below with reference to the accompanying drawings. The following embodiments are just examples and a variety of modifications are possible within the scope of the present invention.

(1) First Embodiment

Figure 1:
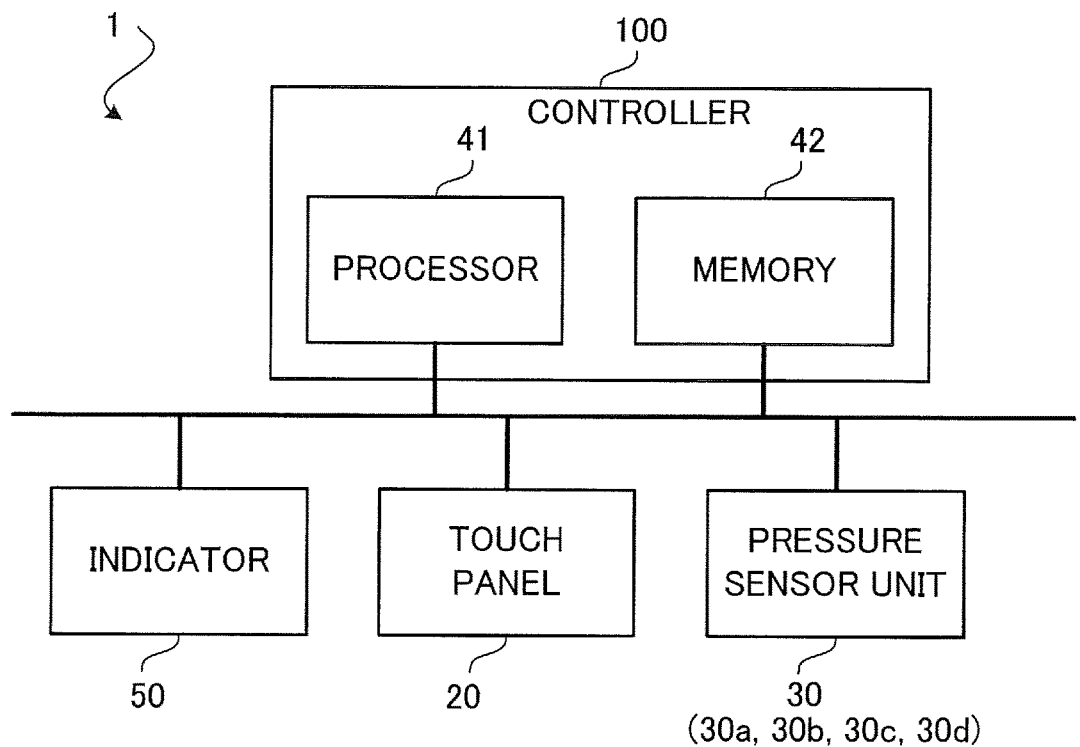
FIG. 1 is a diagram showing an example of a hardware configuration of a touch panel device according to a first embodiment of the present invention.

FIG. 1 is a diagram showing an example of a hardware configuration of a touch panel device 1 according to a first embodiment. As shown in FIG. 1, the touch panel device 1 includes a touch panel 20 that changes a state of a region on an operation surface in which a touch operation is performed, a pressure sensor unit 30 to output a pressure detection signal corresponding to a pressing force applied to the operation surface, and a controller 100 to calculate coordinates of the touch operation on the operation surface based on the state of the touch panel 20. In the first embodiment, the touch panel 20 is a capacitive touch panel in which electrostatic capacitance of a conductor contact region on the operation surface changes. The touch panel 20 includes a display that is arranged in superimposition with the operation surface on which the touch operation (referred to also as a "touch gesture operation" or a "touch input operation") is performed and displays a user interface (UI) image such as an operation component (e.g., icon). The touch panel device 1 may include an indicator 50 that displays information based on a result of the touch operation.

The controller 100 includes a processor 41 as an information processing unit and a memory 42 as a storage unit for storing information, for example. The processor 41 controls the operation of the whole of the touch panel device 1 by executing a program stored in the memory 42. The whole or part of the controller 100 may be formed with a "system on chip" as a control circuit made of semiconductor integrated circuits, or the like. The memory 42 can include various types of storage devices such as a semiconductor storage device, a hard disk drive and a device that records information in a removable record medium. The memory 42 may store conductor contact information acquired from the touch panel 20 and pressure information acquired from the pressure sensor unit 30.

The controller 100 executes a process corresponding to the touch operation performed on the operation surface of the touch panel 20. Specifically, the controller 100 executes a process based on a change in the electrostatic capacitance corresponding to the touch operation performed on the operation surface of the touch panel 20 and the pressure detection signal outputted from the pressure sensor unit 30 corresponding to the pressing force applied to the operation surface. For example, the controller 100 transmits an operation signal corresponding to the touch operation performed on the operation surface of the touch panel 20 to other equipment connected to the touch panel device 1 or other equipment capable of communicating with the touch panel device 1. The equipment is operation target equipment such as external equipment like a production facility, a vehicle or a household electric appliance, for example.

Figure 2:
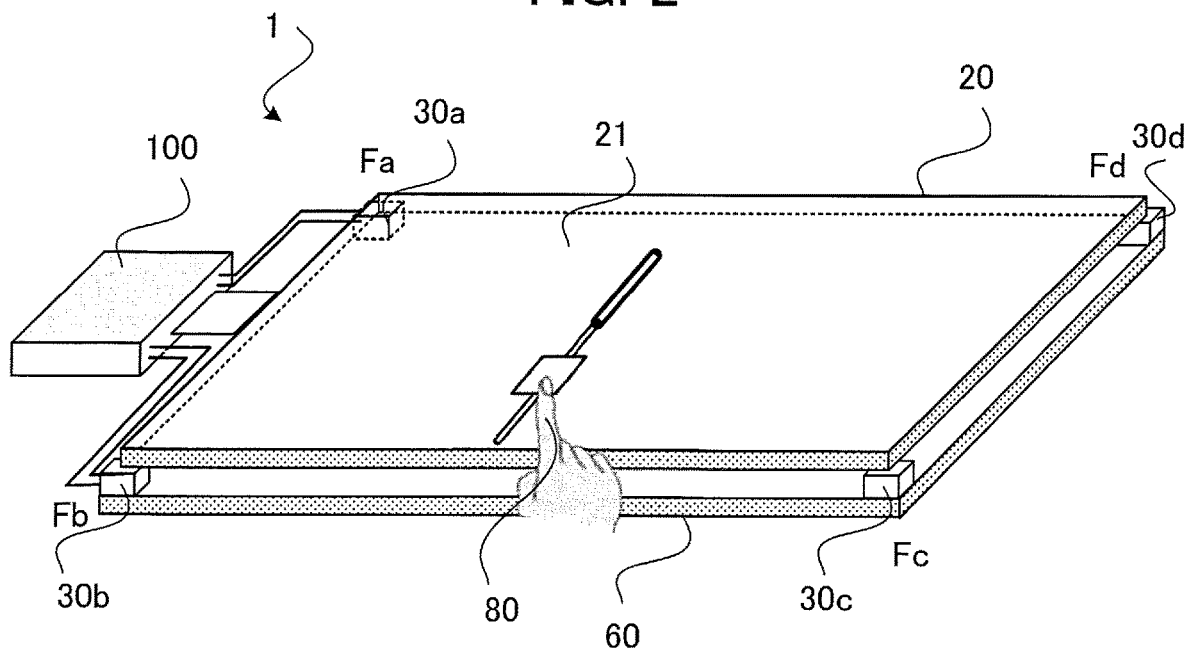
FIG. 2 is a perspective view schematically showing an example of a structure of the touch panel device according to the first embodiment.

FIG. 2 is a perspective view schematically showing an example of the structure of the touch panel device 1. As shown in FIG. 2, the touch panel device 1 includes a substrate 60 and four pressure sensors 30a, 30b, 30c and 30d that support the touch panel 20 on the substrate 60. The substrate 60 can be a part of a housing of the touch panel device 1. Further, while the controller 100 in FIG. 2 is drawn outside the touch panel 20, the controller 100 may be a part of the substrate 60 or a part of a circuit board mounted on the substrate 60. In FIG. 2, the pressure sensors 30a, 30b, 30c and 30d respectively support four corner parts of the touch panel 20 having a quadrangular plan-view shape. The pressure sensors 30a, 30b, 30c and 30d in FIG. 2 constitute the pressure sensor unit 30 in FIG. 1. Incidentally, the pressure sensors 30a, 30b, 30c and 30d may also be arranged to support the touch panel 20 at positions other than the corner parts. Further, the plan-view shape of the touch panel 20 can be a shape other than a quadrangle. Furthermore, the number of the pressure sensors supporting the touch panel 20 can also be three or less, or five or more.

As shown in FIG. 2, the touch panel 20 has an operation surface 21 that receives a touch operation performed by an operator. When a conductor (i.e., electrically conductive object) is in contact with the operation surface 21, the capacitance of the conductor contact region changes. The conductor is, for example, a finger 80 of the operator or an operation assistance tool such as a stylus pen made with electrically conductive material. The controller 100 detects the capacitance at each position on the operation surface 21, thereby acquiring the position (i.e., two-dimensional coordinates on the operation surface 21) of the conductor contact region. Namely, the controller 100 calculates touch position coordinates indicating the position of the conductor contact region on the operation surface 21 based on the capacitance at each position on the operation surface 21 of the touch panel 20. The conductor contact region is, for example, a region in which the capacitance is higher than a predetermined threshold capacitance ThC. The conductor contact region is a "capacitance change region". The touch position coordinates indicating the position of the conductor contact region will be referred to also as "capacitance coordinates".

The pressing force applied to the operation surface 21 of the touch panel 20 is detected by the pressure sensors 30a, 30b, 30c and 30d. The pressure sensors 30a, 30b, 30c and 30d output pressure detection signals indicating pressure values Fa, Fb, Fc and Fd corresponding to a press value Fp as the magnitude of the pressing force applied to the operation surface 21 and a pressing position. The controller 100 is capable of calculating the press value Fp based on the pressure values Fa, Fb, Fc and Fd indicated by the pressure detection signals outputted from the pressure sensors 30a, 30b, 30c and 30d. Further, the controller 100 is capable of calculating the touch position coordinates indicating the pressing position on the operation surface 21 from the pressure values Fa, Fb, Fc and Fd. The touch position coordinates calculated from the pressure values Fa, Fb, Fc and Fd will be referred to also as "pressure coordinates".

Figure 3:
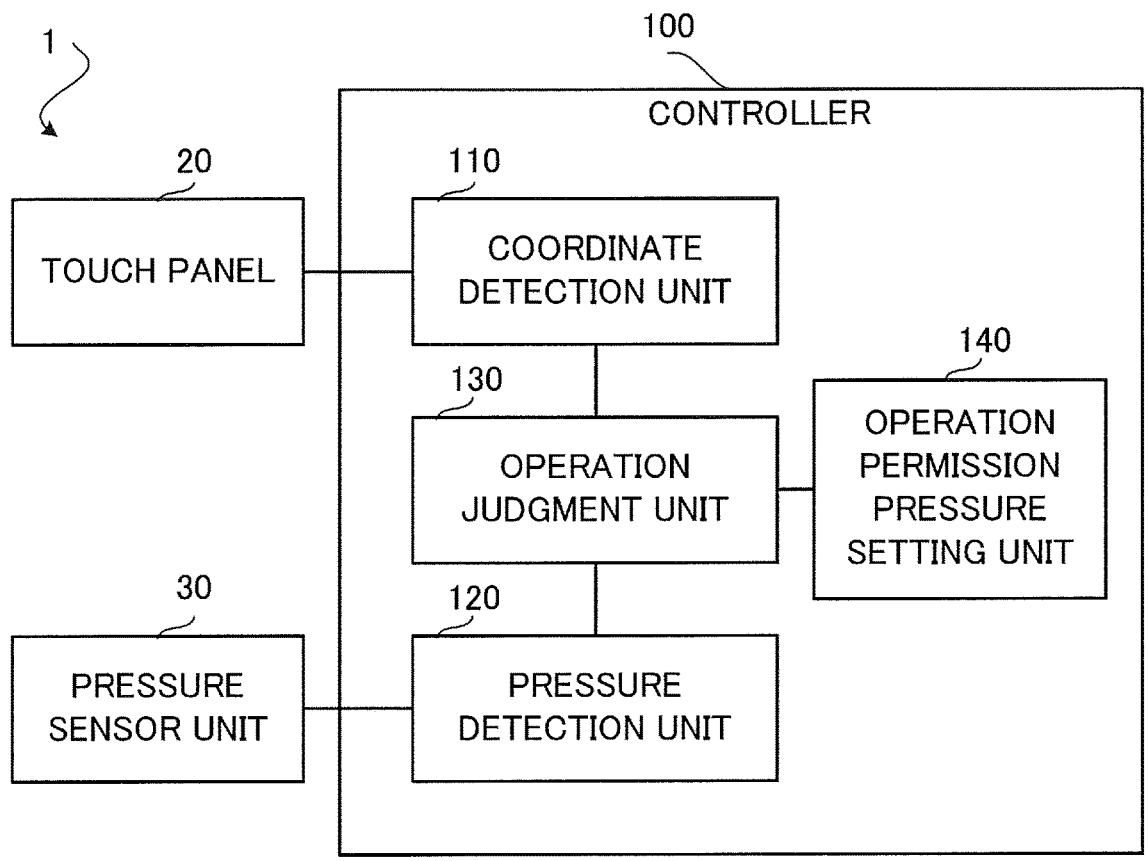
FIG. 3 is a functional block diagram schematically showing the touch panel device according to the first embodiment.

FIG. 3 is a functional block diagram schematically showing the touch panel device 1 according to the first embodiment. In FIG. 3, each component identical or corresponding to a component shown in FIG. 1 is assigned the same reference character as that shown in FIG. 1. As shown in FIG. 3, the controller 100 includes a coordinate detection unit 110, a pressure detection unit 120, an operation judgment unit 130, and an operation permission pressure setting unit 140 including a storage unit.

An operation component (referred to also as an "operation object") is displayed on the operation surface 21 of the touch panel 20. The touch operation is an operation using the operation component displayed on the operation surface 21. In the first embodiment, the operation component is a slide bar displayed on the operation surface 21 of the touch panel 20. The displayed slide bar includes a bar part (i.e., rail part) in a shape like a bar and a slider as a moving component moving along the bar part. A lengthwise direction of the bar part corresponds to an input value.

The coordinate detection unit 110 detects whether there is contact of a conductor with the operation surface 21 or not by detecting the capacitance at each position on the operation surface 21 of the touch panel 20. The coordinate detection unit 110 calculates touch position coordinates as the coordinates of the conductor contact region that is a region in which the detected value of the capacitance is higher than the predetermined threshold capacitance ThC. The coordinate detection unit 110 supplies the touch position coordinates to the operation judgment unit 130.

The pressure detection unit 120 receives the pressure detection signals outputted from the pressure sensors 30a, 30b, 30c and 30d constituting the pressure sensor unit 30 and supplies the operation judgment unit 130 with the pressure values Fa, Fb, Fc and Fd indicated by the pressure detection signals.

The operation judgment unit 130 judges operation information inputted by means of the touch operation by using data stored in the operation permission pressure setting unit 140. The data stored in the operation permission pressure setting unit 140 includes, for example, a threshold pressing force ThF and coordinates of the operation components such as the slide bar and the slider.

In the first embodiment, the touch operation includes a first touch operation using a first operation component displayed on the operation surface 21 and a second touch operation using a second operation component displayed on the operation surface 21. In the first embodiment, the first operation component is a part (e.g., first-stage part) in a normal input range (e.g., 231 and 211 in FIG. 4) of a slide bar, and the second operation component is a part (e.g., second-stage part) in a restricted input range (e.g., 212 in FIG. 4) of a slide bar.

The first touch operation is a normal touch operation. When the first touch operation is performed, the operation judgment unit 130 judges that first operation information corresponding to the first touch operation is valid, updates the display of the operation components (e.g., moves the slider on the slide bar), outputs an operation signal to the operation target equipment, and so forth.

The second touch operation is a restricted touch operation. In a case that the press value Fp of the pressing force indicated by the pressure detection signals is greater than the predetermined threshold pressing force ThF when the second touch operation is performed, the operation judgment unit 130 judges that second operation information corresponding to the second touch operation is valid and outputs the second operation information to the operation target equipment. In a case that the press value Fp is lower than or equal to the threshold pressing force ThF when the second touch operation is performed, the operation judgment unit 130 judges that the second operation information is invalid and does not output the second operation information to the operation target equipment.

Figure 4:
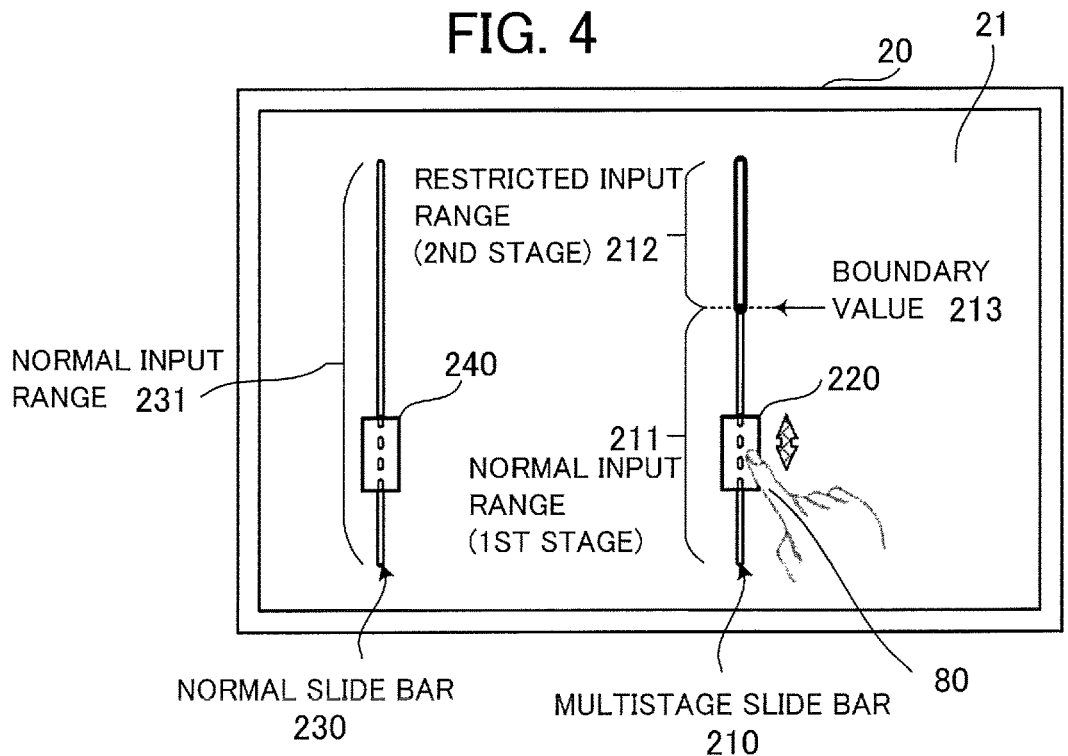
FIG. 4 is a diagram showing slide bars displayed on an operation surface of a touch panel of the touch panel device according to the first embodiment.

FIG. 4 is a diagram showing slide bars displayed on the operation surface 21 of the touch panel 20 of the touch panel device 1 according to the first embodiment. A normal slide bar 230 and a multistage slide bar 210 are shown in FIG. 4. In the example of FIG. 4, the operator can input a value corresponding to the position of a slider 220, 240 by moving the slider 220, 240 upward or downward with the finger 80.

In FIG. 4, the slide bar on the left side is the normal slide bar 230, which is a slide bar on which no boundary value between input ranges is set. Thus, the whole range of the bar part of the normal slide bar 230 is a normal input range 231. The operator can freely move the slider 240 with the finger 80 in the entire range of the normal input range 231.

In FIG. 4, the slide bar on the right side is the multistage slide bar 210, which is a slide bar on which a boundary value 213 between input ranges is set. A first-stage part of the multistage slide bar 210 that is a part lower than the boundary value 213 is a normal input range 211. A second-stage part of the multistage slide bar 210 that is a part upper than the boundary value 213 is a restricted input range 212. The operator can freely move the slider 220 with the finger 80 in the normal input range 211. The touch operation in the normal input range 211 is the first touch operation. However, when performing a predetermined restriction canceling operation (i.e., after performing the predetermined restriction canceling operation or while performing the predetermined restriction canceling operation), the operator can move the slider 220 in the restricted input range 212. The touch operation in the restricted input range 212 is the second touch operation.

Figure 5:
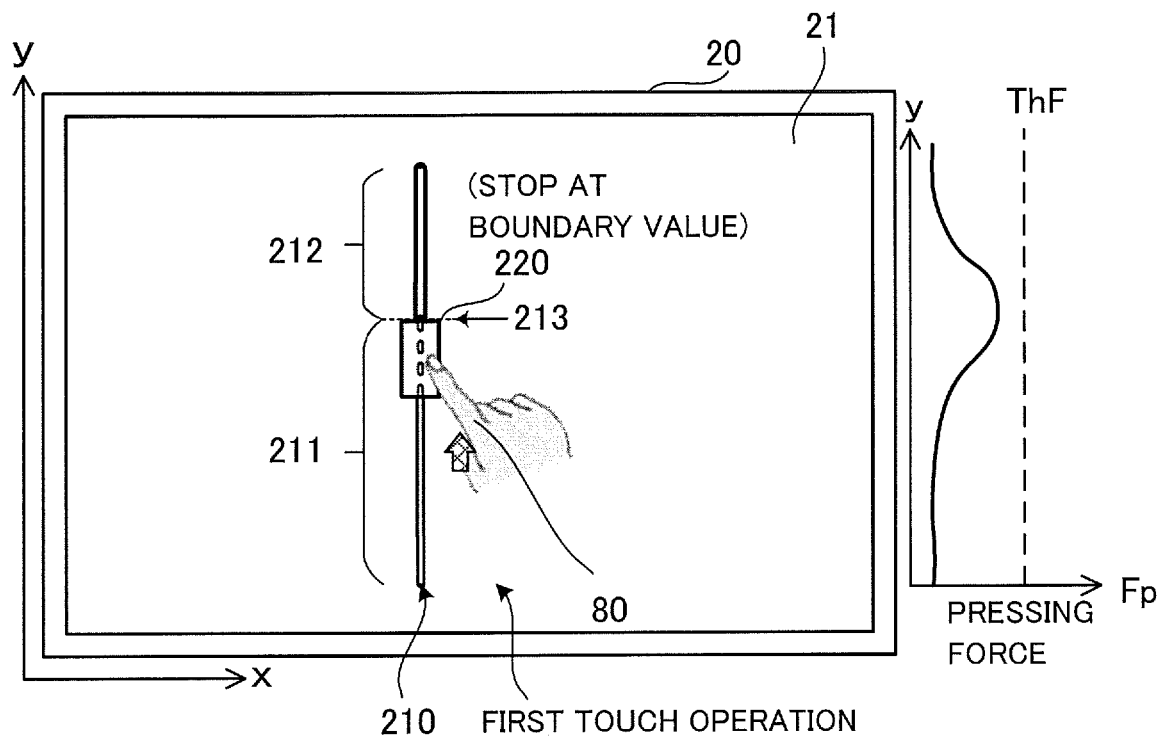
FIG. 5 is a diagram (part 1) showing a touch operation using a multistage slide bar displayed on the operation surface of the touch panel of the touch panel device according to the first embodiment.
Figure 6:
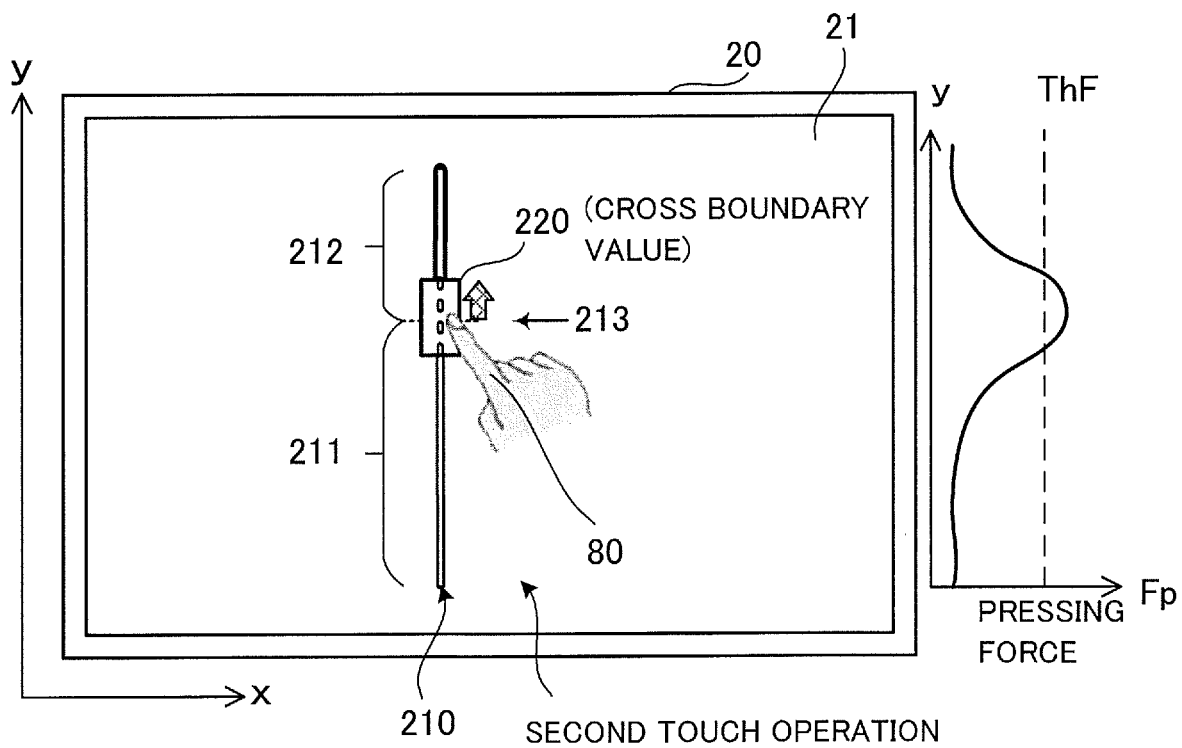
FIG. 6 is a diagram (part 2) showing a touch operation using the multistage slide bar displayed on the operation surface of the touch panel of the touch panel device according to the first embodiment.

FIG. 5 and FIG. 6 are diagrams (part 1 and part 2) showing touch operations using the multistage slide bar 210 on the touch panel device 1 according to the first embodiment. As shown in FIG. 5, when the operator moves the slider 220 upward with the finger 80 with a pressing force on the operation surface 21 at a press value Fp less than or equal to the threshold pressing force ThF, the slider 220 stops at the position of the boundary value 213 (i.e., the position of the upper limit value of the normal input range 211). As shown in FIG. 6, when the operator moves the slider 220 upward with the finger 80 with a pressing force on the operation surface 21 at a press value Fp greater than the threshold pressing force ThF, the slider 220 can cross the position of the boundary value 213 and can move in the restricted input range 212.

FIG. 7 is a flowchart showing the operation of the touch panel device 1 according to the first embodiment. When the sequence shown in FIG. 7 starts, the pressure detection unit 120 is initialized in step S101, and the operation permission pressure setting unit 140 sets the threshold pressing force ThF as an operation permission pressure of the second touch operation in step S102. In the next step S103, the operation judgment unit 130 acquires the position coordinates (x, y) of the touch operation and the press value Fp of the pressing force of the touch operation.

In the next step S104, the operation judgment unit 130 judges whether or not the press value Fp is greater than the threshold pressing force ThF.

When the result of the judgment in the step S104 is NO, the operation judgment unit 130 in step S105 judges whether or not the touch operation is an operation in the normal input range 211 as the first-stage part.

When the result of the judgment in the step S105 is NO, the operation judgment unit 130 does not update a display of the slide bar 210 (e.g., movement of the slider 220 in the restricted input range 212 in FIG. 6) in step S107. When the result of the judgment in the step S105 is YES, the operation judgment unit 130 updates the display of the slide bar 210 (e.g., movement of the slider 220 in the normal input range 211 in FIG. 5) in step S106.

When the result of the judgment in the step S104 is YES, the operation judgment unit 130 in step S108 judges whether or not the touch operation is an operation in the range of the second-stage part (i.e., the restricted input range 212 in FIG. 6).

When the result of the judgment in the step S108 is NO, the operation judgment unit 130 updates the display of the slide bar 210 (e.g., movement of the slider 220 in the normal input range 211 in FIG. 5) in step S109. When the result of the judgment in the step S108 is YES, the operation judgment unit 130 updates the display of the slide bar 210 (e.g., movement of the slider 220 in the restricted input range 212 in FIG. 6) in step S110.

As described above, in the touch panel device 1 according to the first embodiment, a touch operation with a pressing force at a press value Fp greater than the threshold pressing force ThF is used as the condition for enabling the movement of the slider 220 in the restricted input range 212, and thus the occurrence of the erroneous operation in which the second touch operation is carried out against the operator's intention can be avoided. Specifically, it is possible to avoid the occurrence of an erroneous operation in which the second touch operation in the restricted input range 212 which should be performed by the operator while paying enough attention (e.g., an operation in which no mistake is allowed or an operation of a high degree of importance) is erroneously inputted when the operator does not want to.

(2) Second Embodiment

A touch panel device according to a second embodiment differs from the touch panel device 1 according to the first embodiment in the operation components displayed on the operation surface 21 of the touch panel 20 and the method of the touch operation. Except for these features, the second embodiment is the same as the first embodiment. Therefore, FIG. 1 to FIG. 3 will also be referred to in the description of the second embodiment.

Figure 8A:
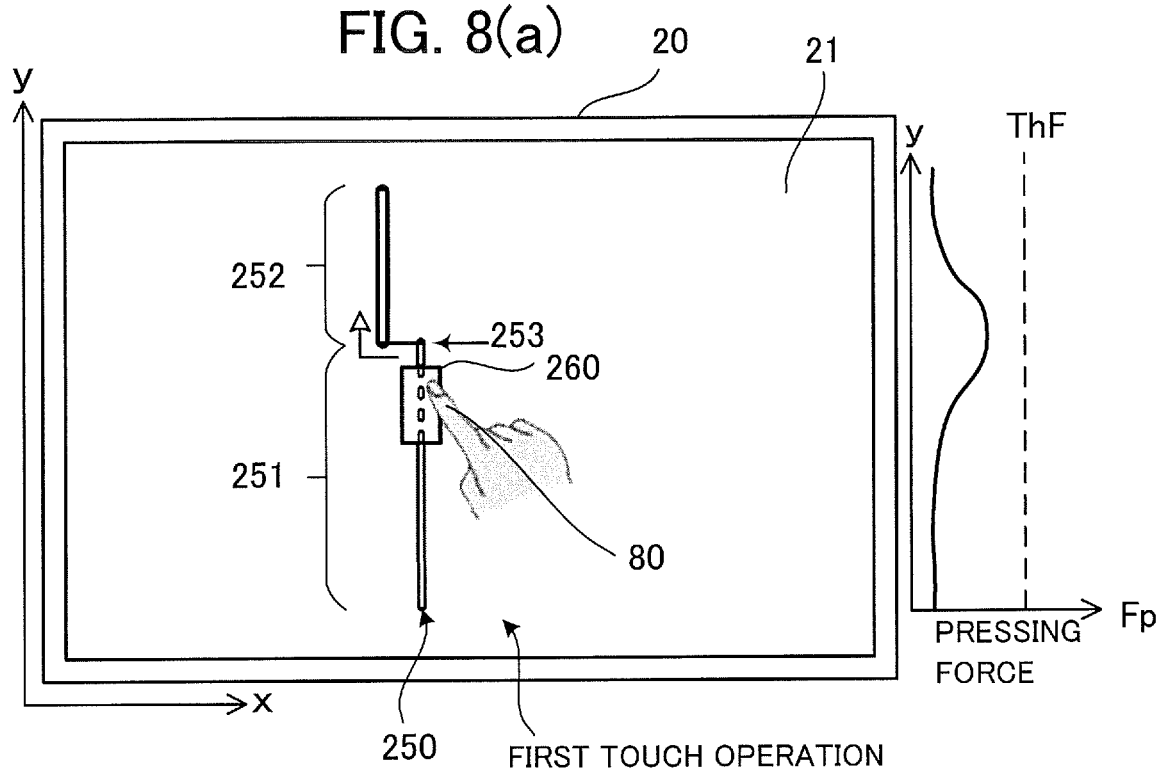
FIGS. 8(a) and 8(b) are diagrams showing touch operations using a multistage slide bar displayed on an operation surface of a touch panel of a touch panel device according to a second embodiment of the present invention.
Figure 8B:
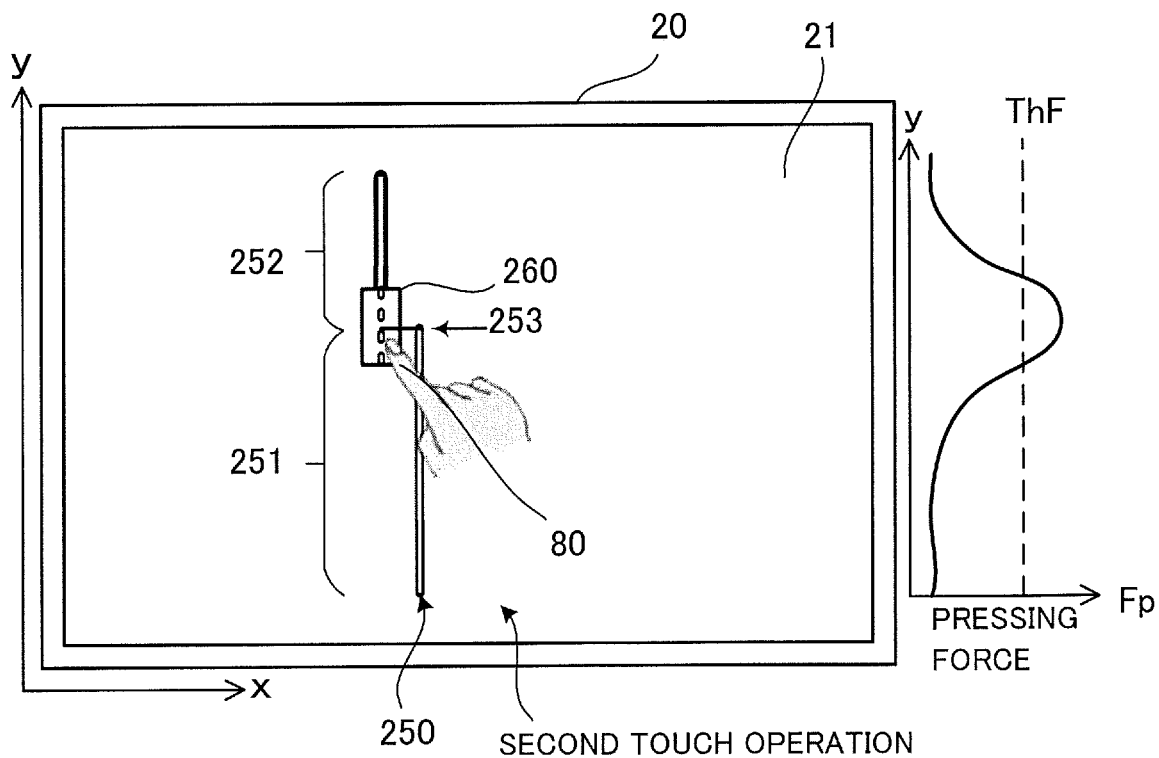

FIGS. 8(a) and 8(b) are diagrams showing touch operations using a multistage slide bar 250 displayed on the operation surface 21 of the touch panel 20 of the touch panel device according to the second embodiment. FIG. 8(a) shows a first touch operation as a touch operation in a normal input range 251 as a first-stage part of the slide bar 250. FIG. 8(b) shows a second touch operation as a touch operation in a restricted input range 252 as a second-stage part of the slide bar 250 or at a boundary value 253.

As shown in FIG. 8(a), when the operator moves a slider 260 upward with the finger 80 with a pressing force on the operation surface 21 at a press value Fp less than or equal to the threshold pressing force ThF, the slider 260 stops at a position on the right side of the boundary value 253 (i.e., the position of the upper limit value of the normal input range 251) or at a position on the left side of the boundary value 253. As shown in FIG. 8(b), when the operator applies a pressing force at a press value Fp greater than the threshold pressing force ThF to the operation surface 21 with the finger 80, the operator can move the slider 260 in the restricted input range 252 as the second-stage part.

Figure 9:
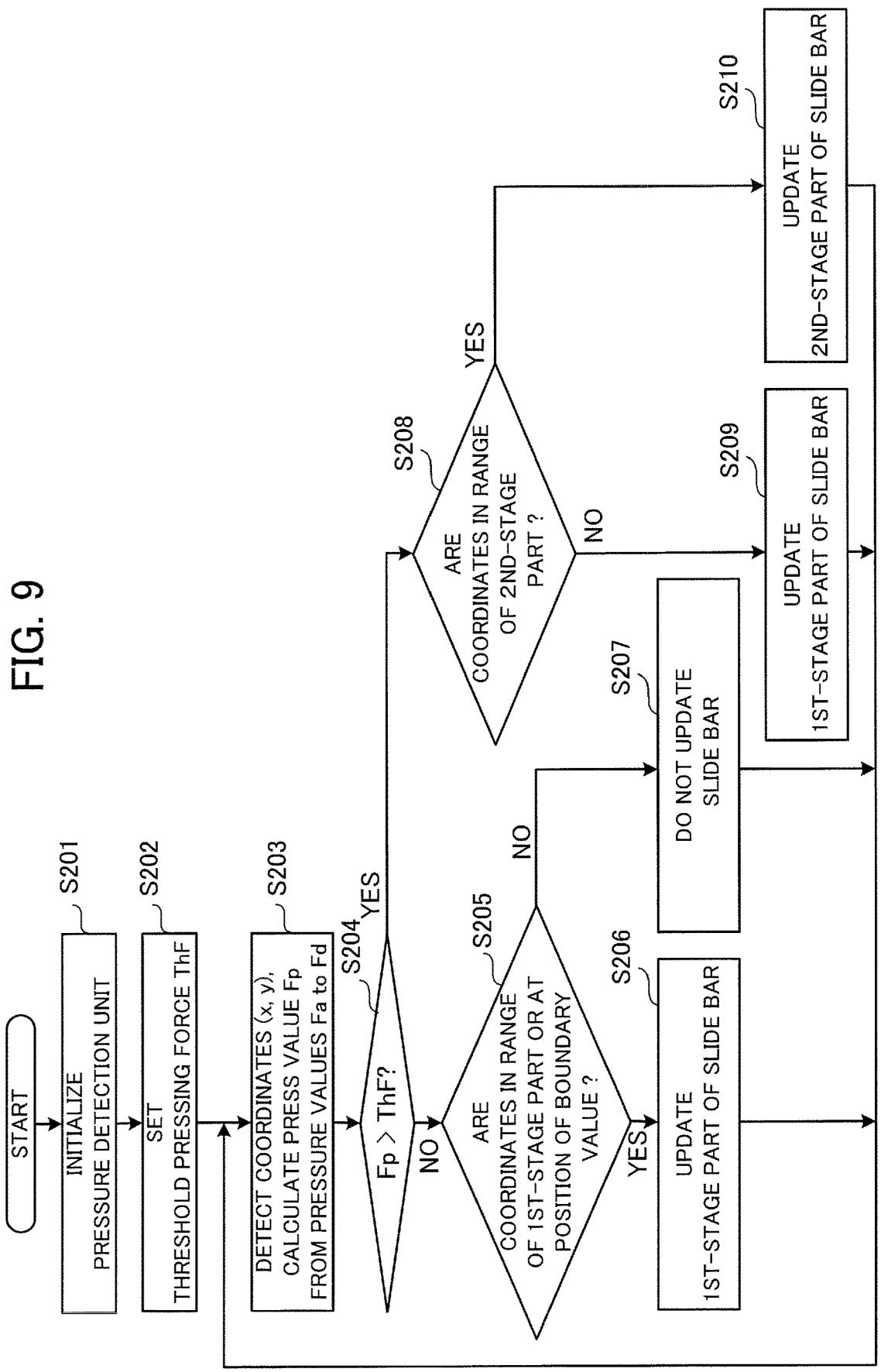
FIG. 9 is a flowchart showing the operation of the touch panel device according to the second embodiment.

FIG. 9 is a flowchart showing the operation of the touch panel device according to the second embodiment. When the sequence shown in FIG. 9 starts, the pressure detection unit 120 is initialized in step S201, and the operation permission pressure setting unit 140 sets the threshold pressing force ThF of the second touch operation in step S202. In the next step S203, the operation judgment unit 130 acquires the position coordinates (x, y) of the touch operation and the press value Fp of the pressing force of the touch operation.

In the next step S204, the operation judgment unit 130 judges whether or not the press value Fp is greater than the threshold pressing force ThF.

When the result of the judgment in the step S204 is NO, the operation judgment unit 130 in step S205 judges whether or not the touch operation is an operation in the normal input range 251 as the range of the first-stage part or at the position of the boundary value.

When the result of the judgment in the step S205 is NO, the operation judgment unit 130 does not update the display of the slide bar 250 in step S207. When the result of the judgment in the step S205 is YES, the operation judgment unit 130 updates the display in the first-stage part of the slide bar 250 (e.g., movement of the slider 260 in the normal input range 251 or at the position of the boundary value 253 in FIG. 8(*a*)) in step S206.

When the result of the judgment in the step S204 is YES, the operation judgment unit 130 in step S208 judges whether or not the touch operation is an operation in the restricted input range 252 as the range of the second-stage part or at the position of the boundary value.

When the result of the judgment in the step S208 is NO, the operation judgment unit 130 updates the display in the first-stage part of the slide bar 250 (e.g., movement of the slider 260 in the normal input range 251 in FIG. 8(*a*)) in step S209. When the result of the judgment in the step S208 is YES, the operation judgment unit 130 updates the display in the second-stage part of the slide bar 250 (e.g., movement of the slider 260 in the restricted input range 252 in FIG. 8(*b*)) in step S210.

As described above, in the touch panel device according to the second embodiment, a touch operation with a pressing force at a press value Fp greater than the threshold pressing force ThF is used as the condition for enabling the movement of the slider 260 in the restricted input range 252, and thus the occurrence of the erroneous operation in which the second touch operation is carried out against the operator's intention can be avoided.

(3) Third Embodiment

A touch panel device according to a third embodiment differs from the touch panel device 1 according to the first embodiment in the operation components displayed on the operation surface 21 of the touch panel 20 and the method of the touch operation. Except for these features, the third embodiment is the same as the first embodiment. Therefore, FIG. 1 to FIG. 3 will also be referred to in the description of the third embodiment.

Figure 10:
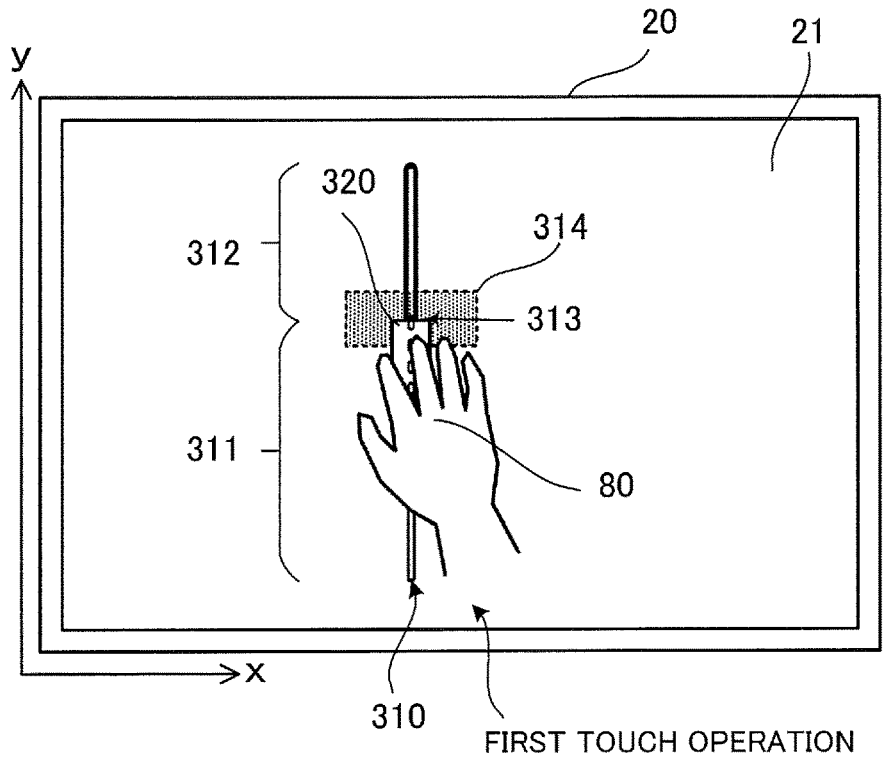
FIG. 10 is a diagram (part 1) showing a touch operation using a multistage slide bar displayed on an operation surface of a touch panel of a touch panel device according to a third embodiment of the present invention.
Figure 11:
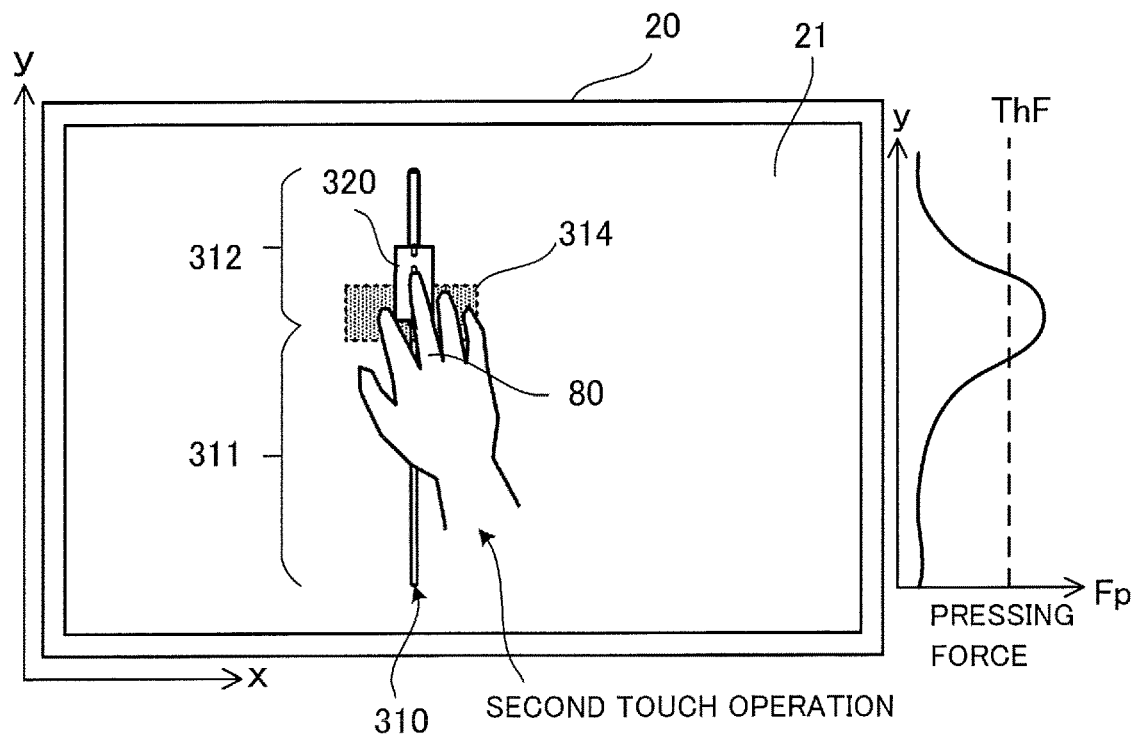
FIG. 11 is a diagram (part 2) showing a touch operation using the multistage slide bar displayed on the operation surface of the touch panel of the touch panel device according to the third embodiment.

FIG. 10 and FIG. 11 are diagrams showing touch operations using a multistage slide bar 310 displayed on the operation surface 21 of the touch panel 20 of the touch panel device according to the third embodiment. FIG. 10 shows a first touch operation as a touch operation in a normal input range 311 as a first-stage part of the slide bar 310. FIG. 11 shows a second touch operation as a touch operation in a restricted input range 312 as a second-stage part of the slide bar 310. In the third embodiment, a fixed region 314 is displayed on each side of a boundary value 313 of the slide bar 310 on the touch panel 20.

As shown in FIG. 10, when the operator moves a slider 320 upward with the finger 80 with a pressing force on the operation surface 21 at a press value Fp less than or equal to the threshold pressing force ThF, the slider 320 stops at the position of the boundary value 313 (i.e., the position of the upper limit value of the normal input range 311). As shown in FIG. 11, when the operator applies a pressing force at a press value Fp greater than the threshold pressing force ThF to the operation surface 21 with the finger 80 and touches the fixed region 314 with another finger, the slider 320 can move in the restricted input range 312 as the second-stage part. FIG. 11 shows a second touch operation of moving the slider 320 upward with the middle finger while touching the fixed region 314 with the index finger and the ring finger.

Figure 12:
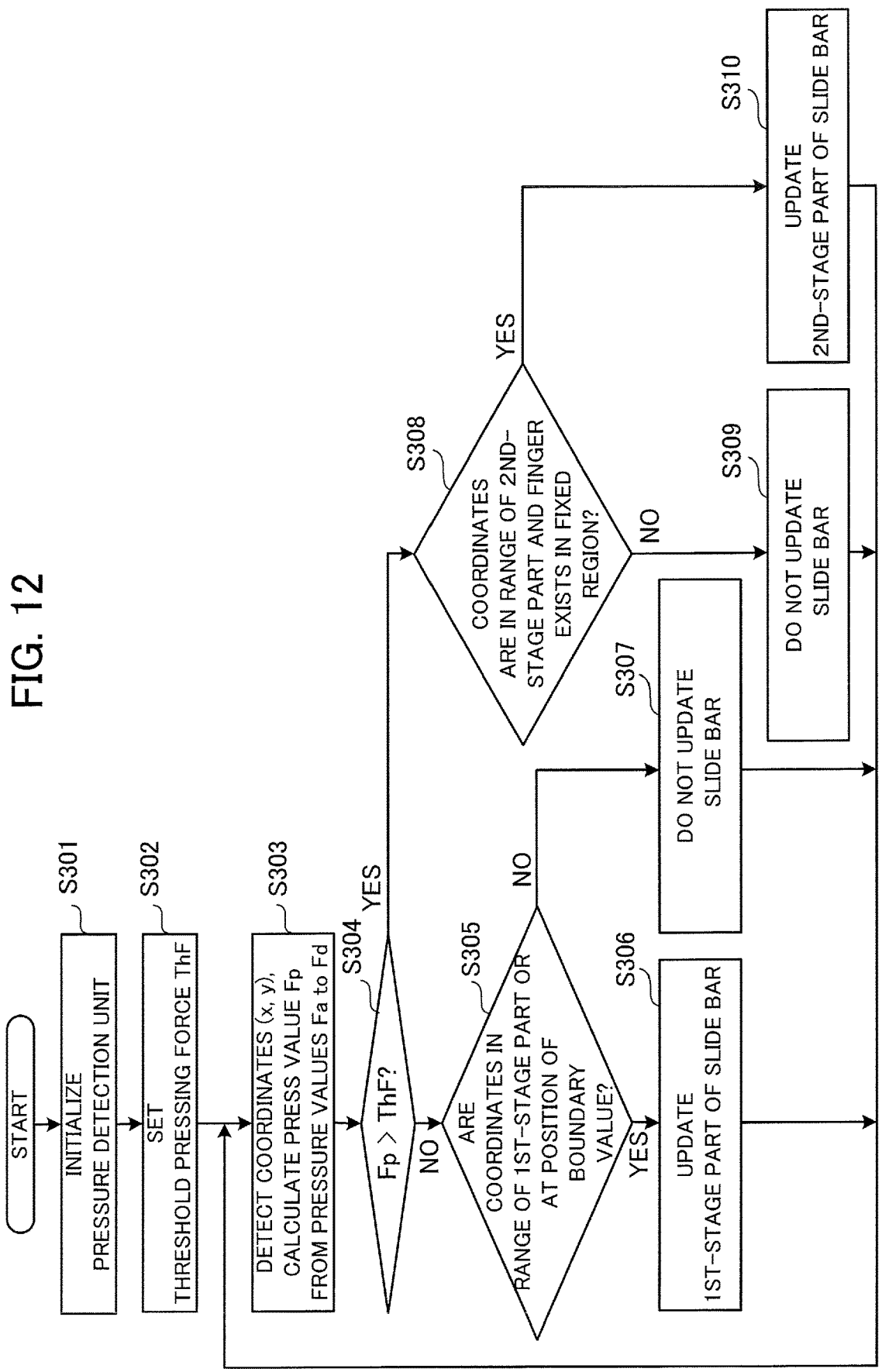
FIG. 12 is a flowchart showing the operation of the touch panel device according to the third embodiment.

FIG. 12 is a flowchart showing the operation of the touch panel device according to the third embodiment. When the sequence shown in FIG. 12 starts, the pressure detection unit 120 is initialized in step S301, and the operation permission pressure setting unit 140 sets the threshold pressing force ThF of the second touch operation in step S302. In the next step S303, the operation judgment unit 130 acquires the position coordinates (x, y) of the touch operation and the press value Fp of the pressing force of the touch operation.

In the next step S304, the operation judgment unit 130 judges whether or not the press value Fp is greater than the threshold pressing force ThF.

When the result of the judgment in the step S304 is NO, the operation judgment unit 130 in step S305 judges whether or not the touch operation is an operation in the normal input range 311 as the range of the first-stage part or at the position of the boundary value 313.

When the result of the judgment in the step S305 is NO, the operation judgment unit 130 does not update the display of the slide bar 310 (e.g., movement of the slider 320 in the restricted input range 312 in FIG. 11) in step S307. When the result of the judgment in the step S305 is YES, the operation judgment unit 130 updates the display of the slide bar 310 (e.g., movement of the slider 320 in the normal input range 311 or at the position of the boundary value 313 in FIG. 10) in step S306.

When the result of the judgment in the step S304 is YES, the operation judgment unit 130 in step S308 judges whether or not the touch operation is a touch operation in the range of the second-stage part (i.e., the restricted input range 312 in FIG. 11) and there is a touch on the fixed region 314.

When the result of the judgment in the step S308 is NO, the operation judgment unit 130 does not update the display of the slide bar 310 (e.g., movement of the slider 320 in the normal input range 311 in FIG. 11) in step S309. When the result of the judgment in the step S308 is YES, the operation judgment unit 130 updates the display of the slide bar 310 (e.g., movement of the slider 320 in the restricted input range 312 in FIG. 11) in step S310.

As described above, in the touch panel device according to the third embodiment, performing both of a touch operation with a pressing force at a press value Fp greater than the threshold pressing force ThF and a touch operation on the fixed region 314 is used as the condition for enabling the movement of the slider 320 in the restricted input range 312, and thus the occurrence of the erroneous operation in which the second touch operation is carried out against the operator's intention can be avoided.

(4) Fourth Embodiment

A touch panel device according to a fourth embodiment differs from the touch panel device 1 according to the first embodiment in the operation components displayed on the operation surface 21 of the touch panel 20 and the method of the touch operation. Except for these features, the fourth embodiment is the same as the first embodiment. Therefore, FIG. 1 to FIG. 3 will also be referred to in the description of the fourth embodiment.

Figure 13A:
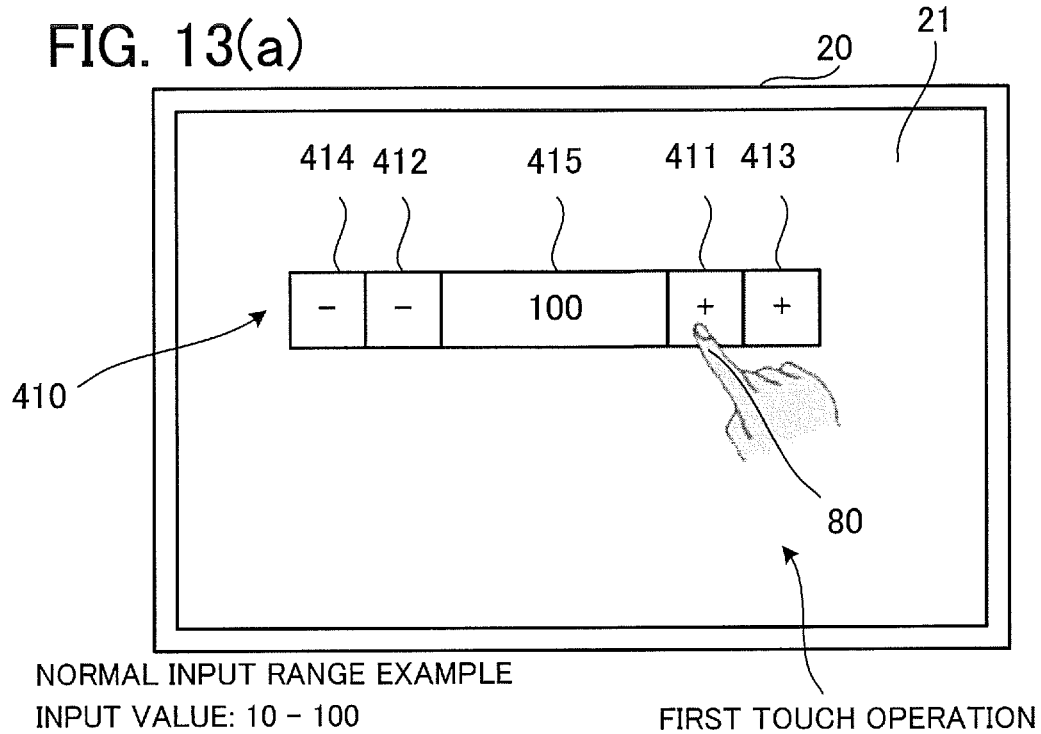
FIGS. 13(a) and 13(b) are diagrams showing touch operations using numerical input components displayed on an operation surface of a touch panel of a touch panel device according to a fourth embodiment of the present invention.
Figure 13B:
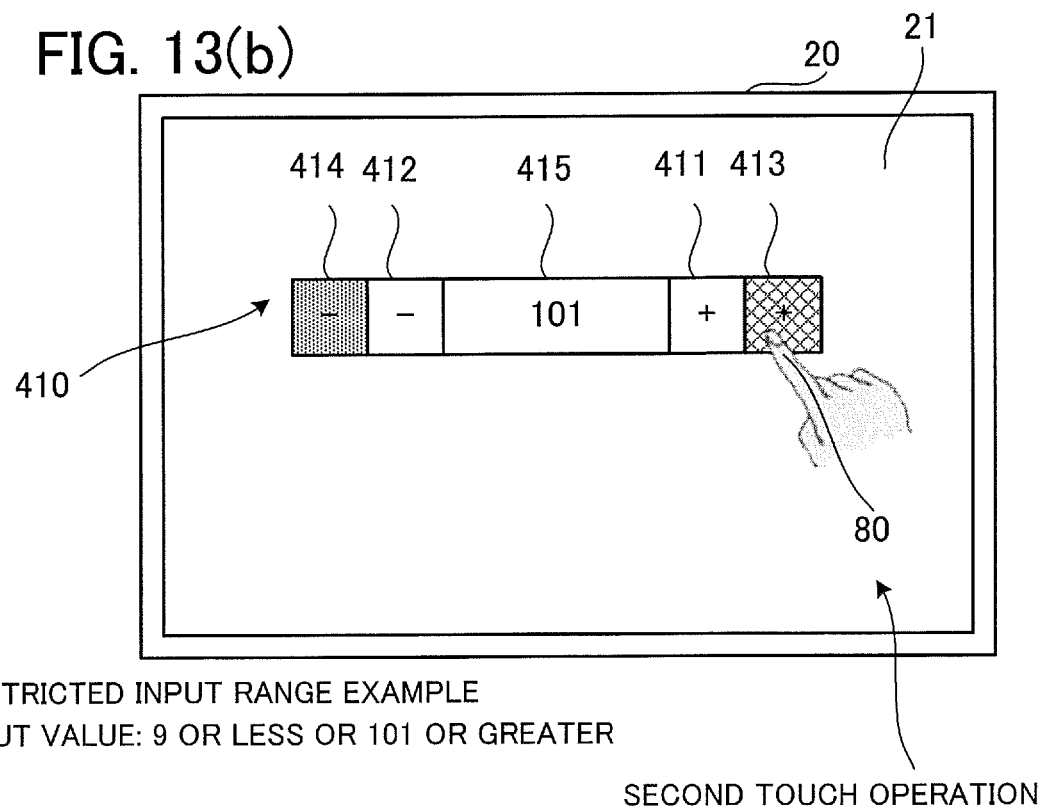

FIGS. 13(a) and 13(b) are diagrams showing touch operations using a numerical input component 410 displayed on the operation surface 21 of the touch panel 20 of the touch panel device according to the fourth embodiment. The numerical input component 410 includes a "+" button 411 as a first increment button, a "−" button 412 as a first decrement button, a "+" button 413 as a second increment button, a "−" button 414 as a second decrement button, and a numerical value display part 415. As an example, a description will be given of a case where the normal input range is a range of numerical values (integers) from "10" to "100" and the restricted input range is a range of numerical values less than or equal to "9" and greater than or equal to "101"; as to the restricted input range, a numerical value change is possible only when a predetermined condition is satisfied.

As shown in FIG. 13(a), when the operator performs a touch operation on the "+" button 411 with the finger 80 with a pressing force on the operation surface 21 at a press value Fp less than or equal to the threshold pressing force ThF, an output value as the numerical value displayed on the numerical value display part 415 increases (e.g., increases by 1) every time it is touched; however, the numerical value stops increasing even with a touch operation with the same pressing force when the numerical value reaches a boundary value (namely, the upper limit value of the normal input range) "100". When the operator performs a touch operation on the "−" button 412 with the finger 80 with a pressing force on the operation surface 21 at a press value Fp less than or equal to the threshold pressing force ThF, the output value as the numerical value displayed on the numerical value display part 415 decreases (e.g., decreases by 1) every time it is touched; however, the numerical value stops decreasing even with a touch operation with the same pressing force when the numerical value reaches a boundary value (namely, the lower limit value of the normal input range) "10".

As shown in FIG. 13(b), when the operator performs a touch operation on the "+" button 413 with the finger 80 with a pressing force on the operation surface 21 at a press value Fp greater than the threshold pressing force ThF, the output value as the numerical value displayed on the numerical value display part 415 increases (e.g., increases by 1) every time it is touched. In this case, the numerical value can be increased to a value greater than or equal to "101" exceeding the boundary value (namely, the upper limit value of the normal input range) by the same touch operation. When the operator performs a touch operation on the "−" button 414 with the finger 80 with a pressing force on the operation surface 21 at a press value Fp greater than the threshold pressing force ThF, the output value as the numerical value displayed on the numerical value display part 415 decreases (e.g., decreases by 1) every time it is touched. In this case, the numerical value can be decreased to a value less than or equal to "9" lower than the boundary value (namely, the lower limit value of the normal input range) by the same touch operation.

Figure 14:
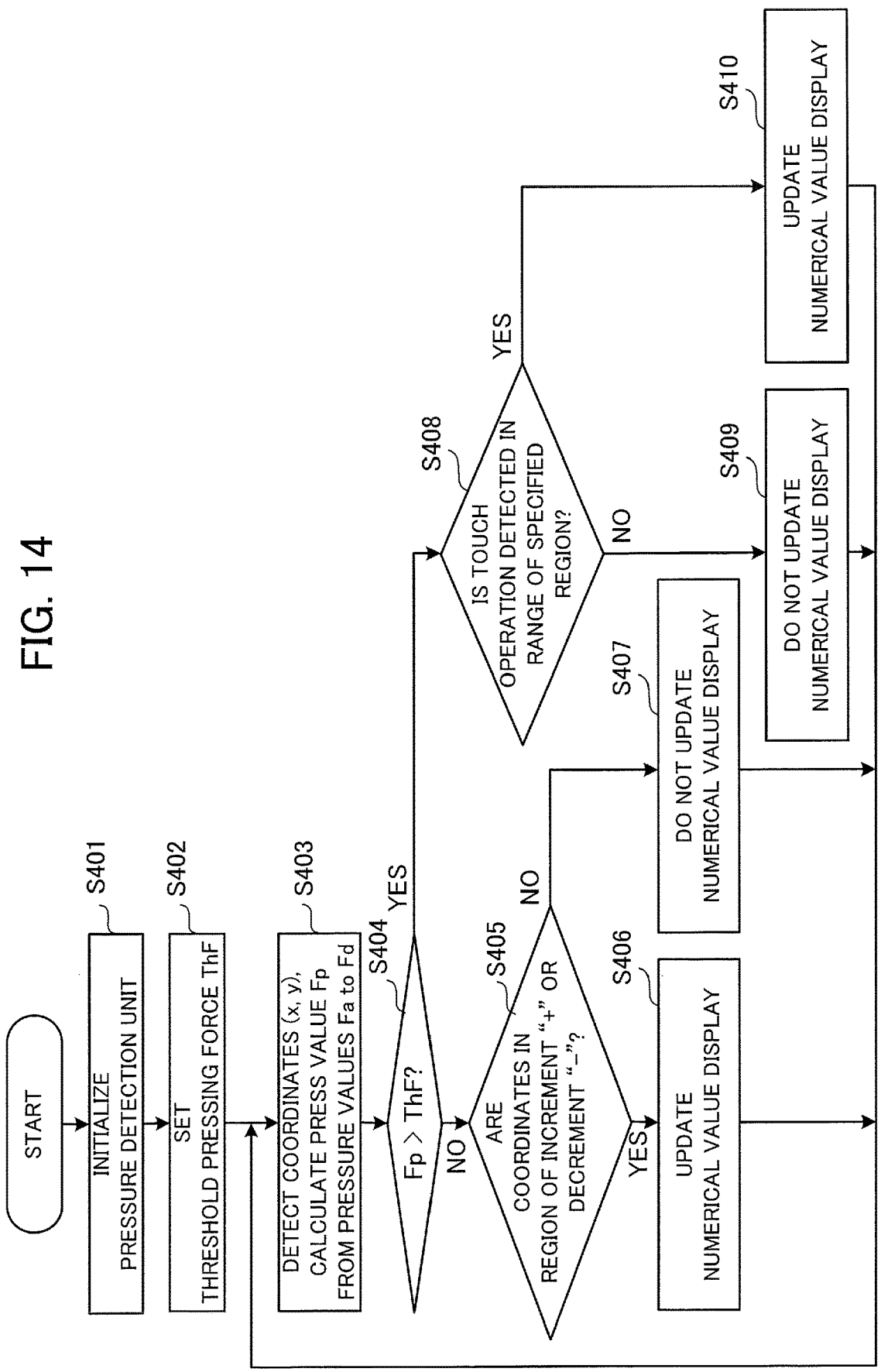
FIG. 14 is a flowchart showing the operation of the touch panel device according to the fourth embodiment.

FIG. 14 is a flowchart showing the operation of the touch panel device according to the fourth embodiment. When the sequence shown in FIG. 14 starts, the pressure detection unit 120 is initialized in step S401, and the operation permission pressure setting unit 140 sets the threshold pressing force ThF of the second touch operation in step S402. In the next step S403, the operation judgment unit 130 acquires the position coordinates (x, y) of the touch operation and the press value Fp of the pressing force of the touch operation.

In the next step S404, the operation judgment unit 130 judges whether or not the press value Fp is greater than the threshold pressing force ThF.

When the result of the judgment in the step S404 is NO, the operation judgment unit 130 in step S405 judges whether or not the touch operation is an operation in the normal input range (i.e., on the "+" button 411 or the "−" button 412 in FIG. 13(a)).

When the result of the judgment in the step S405 is NO, the operation judgment unit 130 does not update the numerical value display on the numerical value display part 415 in step S407. When the result of the judgment in the step S405 is YES, the operation judgment unit 130 updates the numerical value display on the numerical value display part 415 in step S406.

When the result of the judgment in the step S404 is YES, the operation judgment unit 130 in step S408 judges whether or not the touch operation is an operation in the restricted input range as a specified region of the numerical input component 410 (i.e., on the "+" button 413 or the "−" button 414 in FIG. 13(b)).

When the result of the judgment in the step S408 is NO, the operation judgment unit 130 does not update the numerical value display on the numerical value display part 415 in step S409. When the result of the judgment in the step S408 is YES, the operation judgment unit 130 updates the numerical value display on the numerical value display part 415 in step S410.

As described above, in the touch panel device according to the fourth embodiment, a touch operation with a pressing force at a press value Fp greater than the threshold pressing force ThF and a touch operation in the specified region are used as the condition for enabling the numerical value change in the restricted input range, and thus the occurrence of the erroneous operation in which the second touch operation is carried out against the operator's intention can be avoided.

(5) Fifth Embodiment

A touch panel device according to a fifth embodiment differs from the touch panel device according to the first embodiment in the operation components displayed on the operation surface 21 of the touch panel 20 and the method of the touch operation. Except for these features, the fifth embodiment is the same as the first embodiment. Therefore, FIG. 1 to FIG. 3 will also be referred to in the description of the fifth embodiment.

FIGS. 15(a) to 15(d) are diagrams showing touch operations using a numerical input component 510 displayed on the operation surface 21 of the touch panel 20 of the touch panel device according to the fifth embodiment. The numerical input component 510 includes a "+" button 511 as a first increment button, a "−" button 512 as a first decrement button, a "+" button 513 as a second increment button, a "−" button 514 as a second decrement button, and a numerical value display part 515. As an example, a description will be given of a case where the normal input range is a range of numerical values (integers) from "10" to "100" and the restricted input range is a range of numerical values less than or equal to "9" and greater than or equal to "101".

Figure 15A:
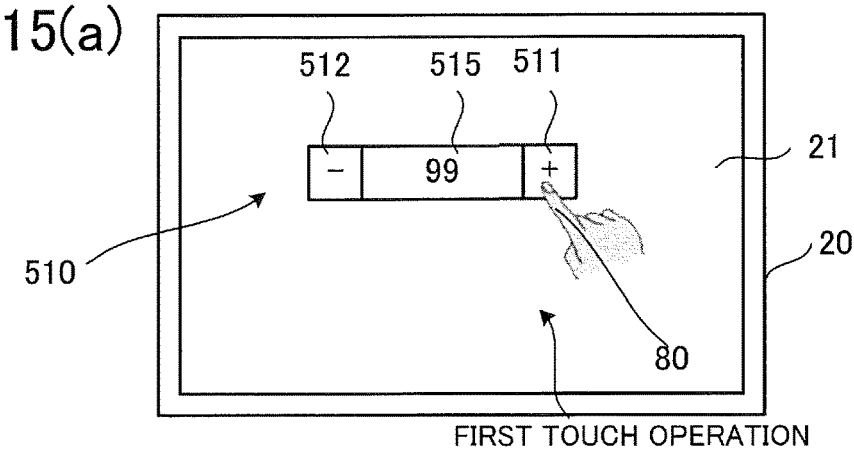
FIGS. 15(a) to 15(d) are diagrams showing touch operations using numerical input components displayed on an operation surface of a touch panel of a touch panel device according to a fifth embodiment of the present invention.

As shown in FIG. 15(a), when the operator performs a touch operation on the "+" button 511 with the finger 80 with a pressing force on the operation surface 21 at a press value Fp less than or equal to the threshold pressing force ThF, the output value as the numerical value displayed on the numerical value display part 515 increases (e.g., increases by 1)

every time it is touched; however, the numerical value stops increasing even with a touch operation with the same pressing force when the numerical value reaches a boundary value (namely, the upper limit value of the normal input range) "100". Each time the operator touches the "−" button 512 with the finger 80 with a pressing force on the operation surface 21 at a press value Fp less than or equal to the threshold pressing force ThF, the output value as the numerical value displayed on the numerical value display part 515 decreases (e.g., decreases by 1); however, the numerical value stops decreasing even with a touch operation with the same pressing force when the numerical value reaches a boundary value (namely, the lower limit value of the normal input range) "10".

Figure 15B:
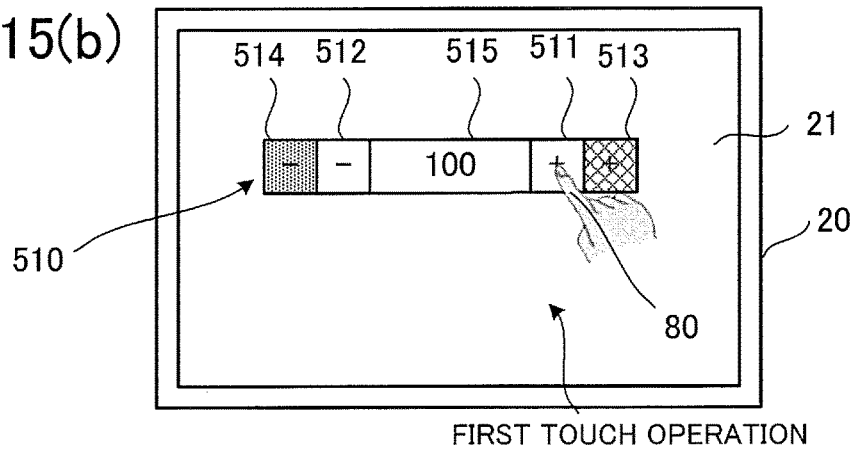
Figure 15C:
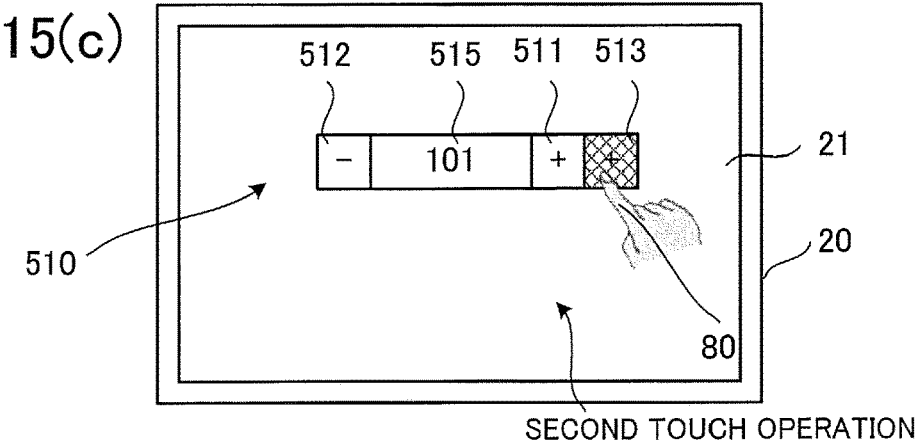
Figure 15D:
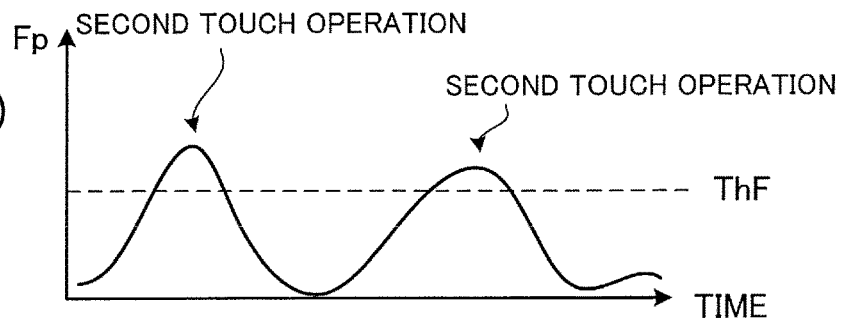

As shown in FIG. 15(b), when the operator touches the "+" button 511 with the finger 80 with a pressing force on the operation surface 21 at a press value Fp greater than the threshold pressing force ThF, the "+" button 513 appears. As shown in FIG. 15(c), when the finger 80 performs a touch operation on the "+" button 513 with a pressing force on the operation surface 21 at a press value Fp greater than the threshold pressing force ThF, the output value as the numerical value displayed on the numerical value display part 515 increases (e.g., increases by 1) every time it is touched, and the numerical value can be increased to a value greater than or equal to "101" exceeding the boundary value (namely, the upper limit value of the normal input range).

Further, when the operator touches the "−" button 512 with the finger 80 with a pressing force on the operation surface 21 at a press value Fp greater than the threshold pressing force ThF when "10" is displayed on the numerical value display part 515, the "−" button 514 appears. In this case, when the operator performs a touch operation on the "−" button 514 with the finger 80 with a pressing force on the operation surface 21 at a press value Fp greater than the threshold pressing force ThF, the output value as the numerical value displayed on the numerical value display part 515 decreases (e.g., decreases by 1) every time it is touched, and the numerical value can be decreased to a value less than or equal to "9" lower than the boundary value (namely, the lower limit value of the normal input range).

Figure 16:
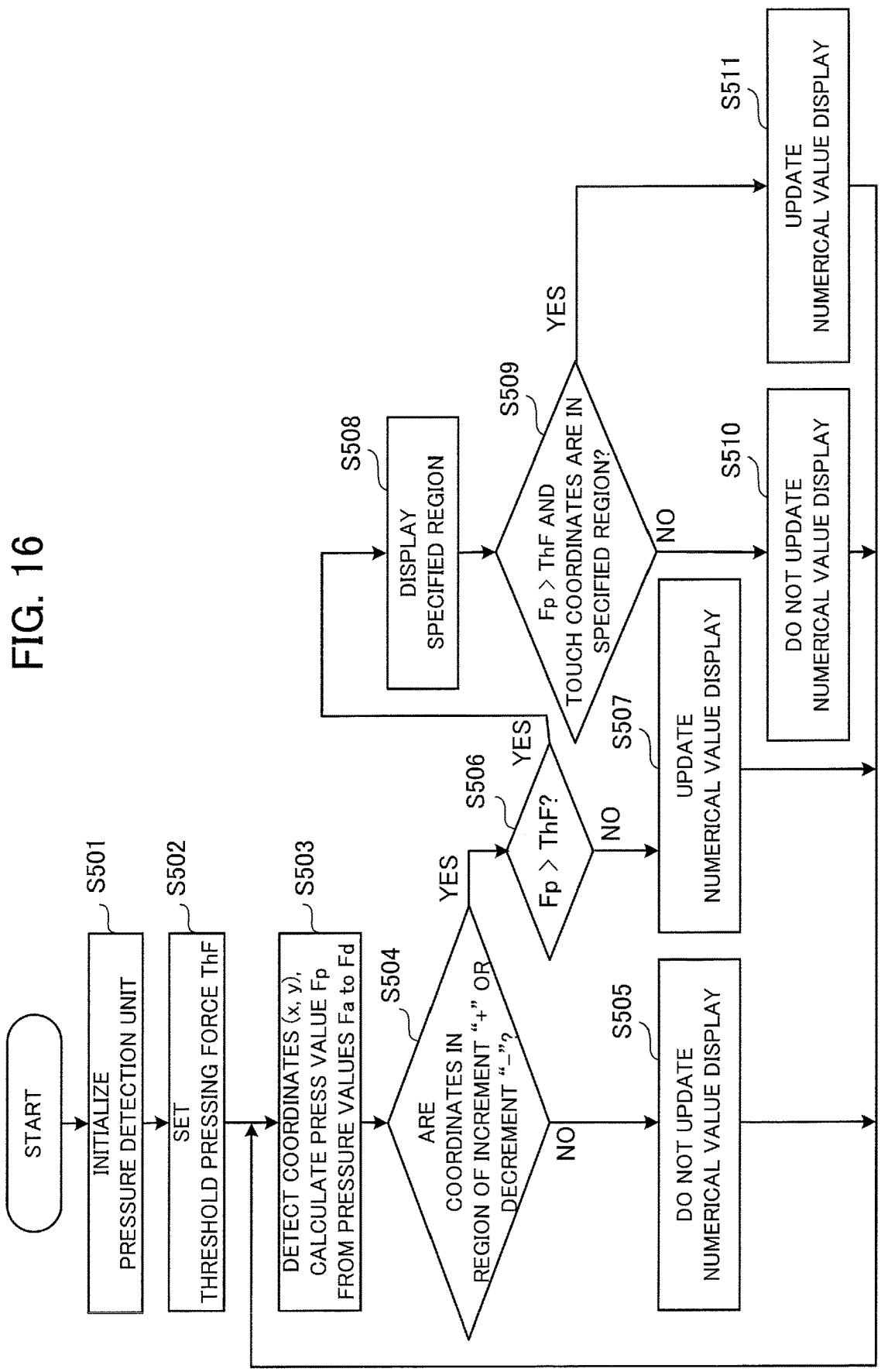
FIG. 16 is a flowchart showing the operation of the touch panel device according to the fifth embodiment.

FIG. 16 is a flowchart showing the operation of the touch panel device according to the fifth embodiment. When the sequence shown in FIG. 16 starts, the pressure detection unit 120 is initialized in step S501, and the operation permission pressure setting unit 140 sets the threshold pressing force ThF of the second touch operation in step S502. In the next step S503, the operation judgment unit 130 acquires the position coordinates (x, y) of the touch operation and the press value Fp of the pressing force of the touch operation.

In the next step S504, the operation judgment unit 130 judges whether or not the touch operation is an operation in the normal input range (i.e., on the "+" button 511 or the "−" button 512 in FIG. 15(a)).

When the result of the judgment in the step S504 is NO, the operation judgment unit 130 does not update the numerical value display on the numerical value display part 515 in step S505.

When the result of the judgment in the step S504 is YES, the operation judgment unit 130 in step S506 judges whether or not the press value Fp is greater than the threshold pressing force ThF.

When the result of the judgment in the step S506 is NO, the operation judgment unit 130 updates the numerical value display on the numerical value display part 515 in step S507.

When the result of the judgment in the step S506 is YES, the operation judgment unit 130 in step S508 has the specified region (namely, 513 or 514 in FIG. 15(b)) displayed.

In the next step S509, the operation judgment unit 130 judges whether or not the press value Fp is greater than the threshold pressing force ThF and the touch operation is an operation in the restricted input range as the specified region of the numerical input component 510.

When the result of the judgment in the step S509 is NO, the operation judgment unit 130 does not update the numerical value display on the numerical value display part 515 in step S510. When the result of the judgment in the step S509 is YES, the operation judgment unit 130 updates the numerical value display on the numerical value display part 515 in step S511.

As described above, in the touch panel device according to the fifth embodiment, a touch operation with a pressing force at a press value Fp greater than the threshold pressing force ThF and a touch operation in the specified region are used as the condition for enabling the numerical value change in the restricted input range, and thus the occurrence of the erroneous operation in which the second touch operation is carried out against the operator's intention can be avoided.

(6) Sixth Embodiment

A touch panel device according to a sixth embodiment differs from the touch panel device according to the first embodiment in the operation components displayed on the operation surface 21 of the touch panel 20 and the method of the touch operation. Except for these features, the sixth embodiment is the same as the first embodiment. Therefore, FIG. 1 to FIG. 3 will also be referred to in the description of the sixth embodiment.

Figure 17A:
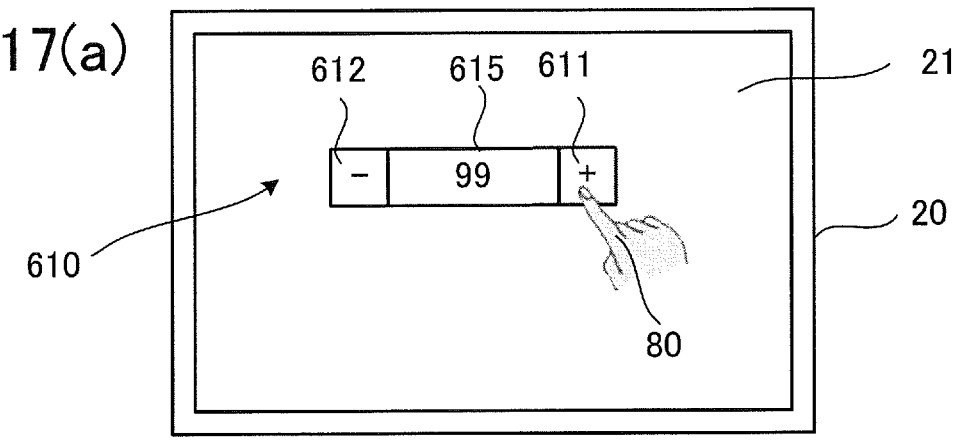
FIGS. 17(a) to 17(c) are diagrams showing touch operations using numerical input components displayed on an operation surface of a touch panel of a touch panel device according to a sixth embodiment of the present invention.
Figure 17B:
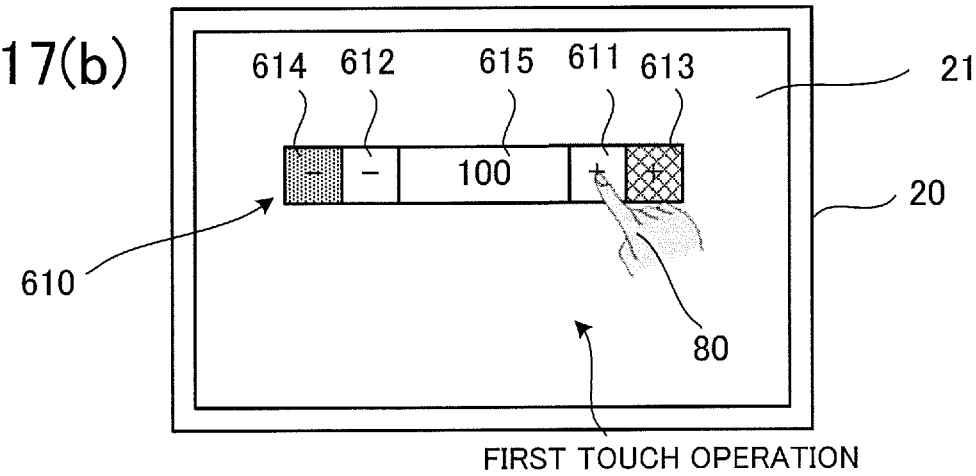
Figure 17C:
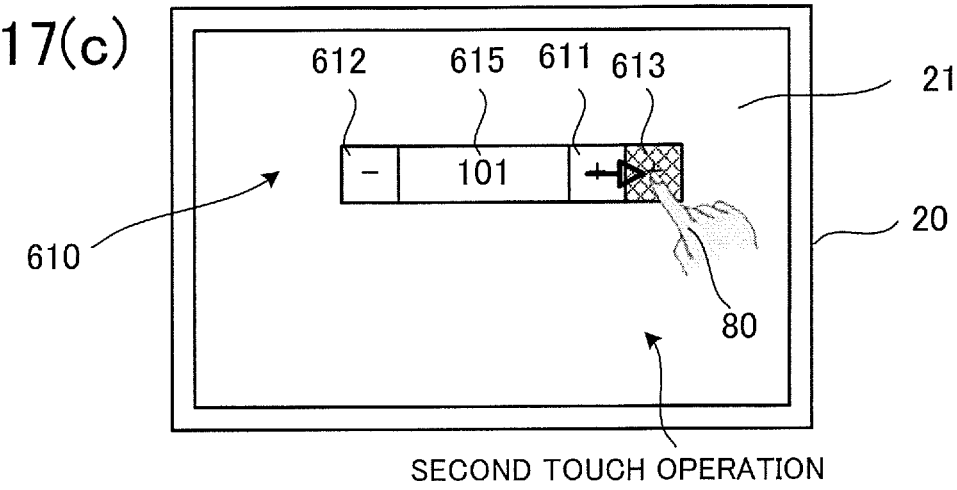

FIGS. 17(a) to 17(c) are diagrams showing touch operations using a numerical input component 610 displayed on the operation surface 21 of the touch panel 20 of the touch panel device according to the sixth embodiment. The numerical input component 610 includes a "+" button 611 as a first increment button, a "−" button 612 as a first decrement button, a "+" button 613 as a second increment button, a "−" button 614 as a second decrement button, and a numerical value display part 615. As an example, a description will be given of a case where the normal input range is a range of numerical values (integers) from "10" to "100" and the restricted input range is a range of numerical values less than or equal to "9" and greater than or equal to "101".

As shown in FIG. 17(a), when the operator performs a touch operation on the "+" button 611 with the finger 80 with a pressing force on the operation surface 21 at a press value Fp less than or equal to the threshold pressing force ThF, the output value as the numerical value displayed on the numerical value display part 615 increases (e.g., increases by 1) every time it is touched, and the increase stops at a boundary value (namely, the upper limit value of the normal input range) "100". When the operator performs a touch operation on the "−" button 612 with the finger 80 with a pressing force on the operation surface 21 at a press value Fp less than or equal to the threshold pressing force ThF, the output value as the numerical value displayed on the numerical value display part 615 decreases (e.g., decreases by 1) every time it is touched, and the decrease stops at a boundary value (namely, the lower limit value of the normal input range) "10".

As shown in FIG. 17(b), when the operator touches the "+" button 611 with the finger 80 with a pressing force on the operation surface 21 at a press value Fp greater than the threshold pressing force ThF, the "+" button 613 appears. As shown in FIG. 17(c), when the operator performs a swipe operation of sliding the finger 80 from the "+" button 611 to the "+" button 613 with a pressing force on the operation surface 21 at a press value Fp greater than the threshold pressing force ThF, the numerical value input in the restricted input range (e.g., the range greater than or equal to "101") becomes possible. When the operator performs a swipe operation of sliding the finger 80 from the "−" button 612 to the "−" button 614 with a pressing force on the operation surface 21 at a press value Fp greater than the threshold pressing force ThF, the numerical value input in the restricted input range (e.g., the range less than or equal to "9") becomes possible.

Each time the operator touches the "+" button 613 with the finger 80 with a pressing force on the operation surface 21 at a press value Fp greater than the threshold pressing force ThF, the output value as the numerical value displayed on the numerical value display part 615 increases (e.g., increases by 1), and the numerical value can be increased to a value greater than or equal to "101" higher than the boundary value (namely, the upper limit value of the normal input range).

Each time the operator touches the "−" button 614 with the finger 80 with a pressing force on the operation surface 21 at a press value Fp greater than the threshold pressing force ThF, the output value as the numerical value displayed on the numerical value display part 615 decreases (e.g., decreases by 1), and the numerical value can be decreased to a value less than or equal to "9" lower than the boundary value (namely, the lower limit value of the normal input range).

Figure 18:
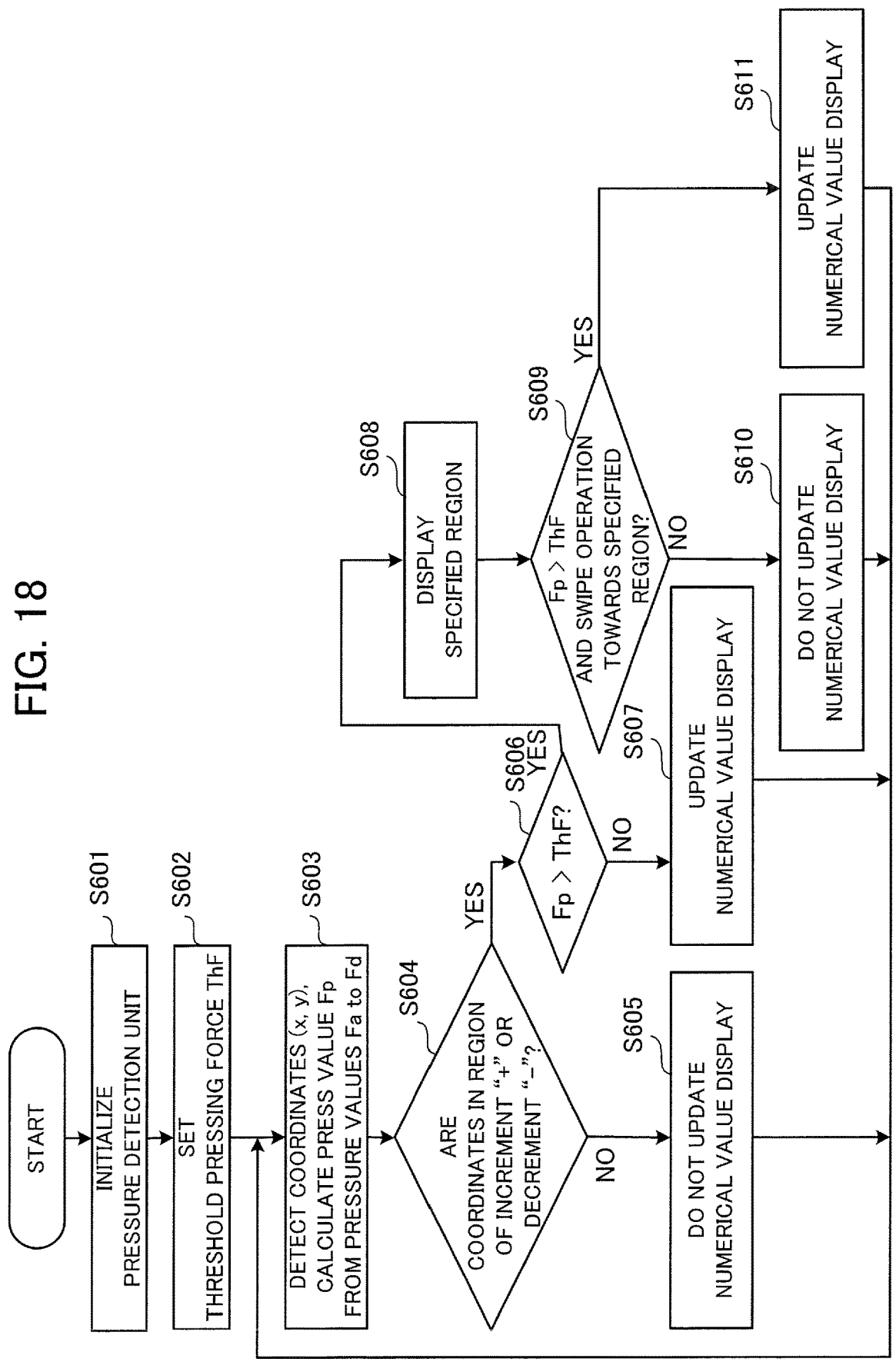
FIG. 18 is a flowchart showing the operation of the touch panel device according to the sixth embodiment.

FIG. 18 is a flowchart showing the operation of the touch panel device according to the sixth embodiment. When the sequence shown in FIG. 18 starts, the pressure detection unit 120 is initialized in step S601, and the operation permission pressure setting unit 140 sets the threshold pressing force ThF of the second touch operation in step S602. In the next step S603, the operation judgment unit 130 acquires the position coordinates (x, y) of the touch operation and the press value Fp of the pressing force of the touch operation.

In the next step S604, the operation judgment unit 130 judges whether or not the touch operation is an operation in the normal input range (i.e., on the "+" button 611 or the "−" button 612 in FIG. 17(a)).

When the result of the judgment in the step S604 is NO, the operation judgment unit 130 does not update the numerical value display on the numerical value display part 615 in step S605.

When the result of the judgment in the step S604 is YES, the operation judgment unit 130 in step S606 judges whether or not the press value Fp is greater than the threshold pressing force ThF.

When the result of the judgment in the step S606 is NO, the operation judgment unit 130 updates the numerical value display on the numerical value display part 615 in step S607.

When the result of the judgment in the step S606 is YES, the operation judgment unit 130 in step S608 has the specified region (namely, the "+" button 613 or the "−" button 614 in FIG. 17(b)) displayed.

In the next step S609, the operation judgment unit 130 judges whether or not the press value Fp is greater than the threshold pressing force ThF and the touch operation is a swipe operation at a position in the restricted input range as the specified region of the numerical input component 610.

When the result of the judgment in the step S609 is NO, the operation judgment unit 130 does not update the numerical value display on the numerical value display part 615 in step S610. When the result of the judgment in the step S609 is YES, the operation judgment unit 130 updates the numerical value display on the numerical value display part 615 in step S611.

As described above, in the touch panel device according to the sixth embodiment, an operation with a pressing force at a press value Fp greater than the threshold pressing force ThF and a swipe operation in the specified region are used as the condition for enabling the numerical value change in the restricted input range, and thus the occurrence of the erroneous operation in which the second touch operation is carried out against the operator's intention can be avoided.

(7) Seventh Embodiment

A touch panel device according to a seventh embodiment differs from the touch panel device according to the first embodiment in the operation components displayed on the operation surface 21 of the touch panel 20 and the method of the touch operation. Except for these features, the seventh embodiment is the same as the first embodiment. Therefore, FIG. 1 to FIG. 3 will also be referred to in the description of the seventh embodiment.

Figure 19A:
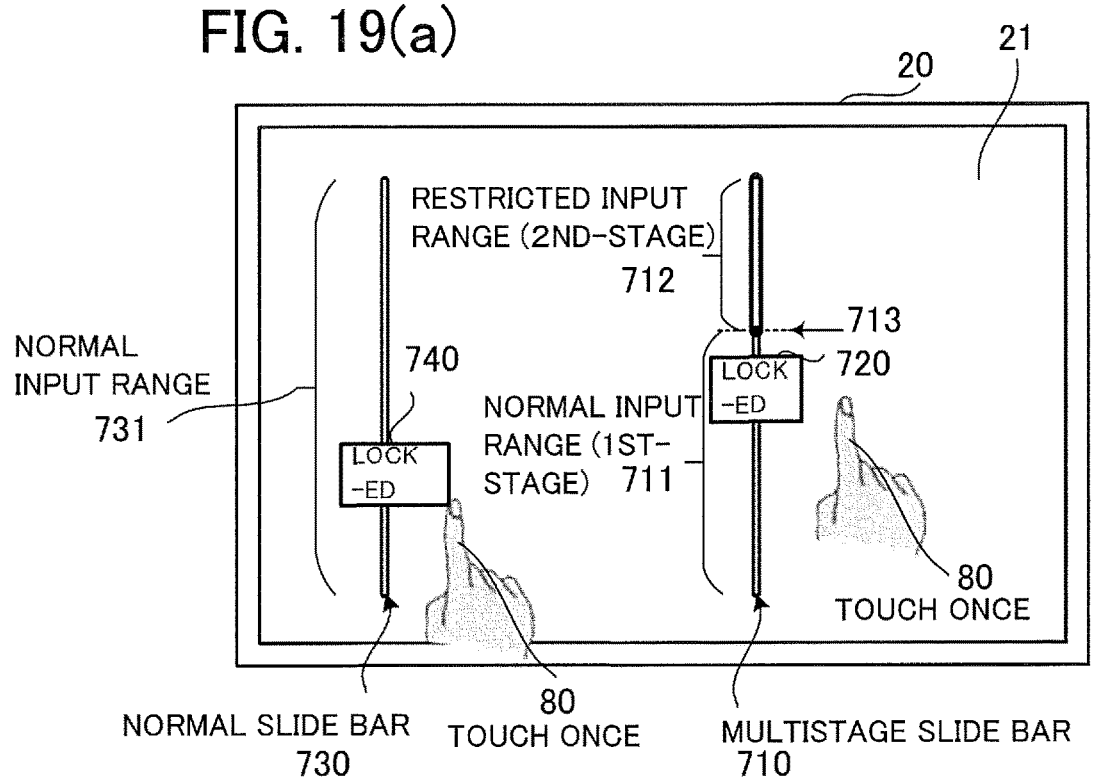
FIGS. 19(a) and 19(b) are diagrams showing touch operations using slide bars displayed on an operation surface of a touch panel of a touch panel device according to a seventh embodiment of the present invention.
Figure 19B:
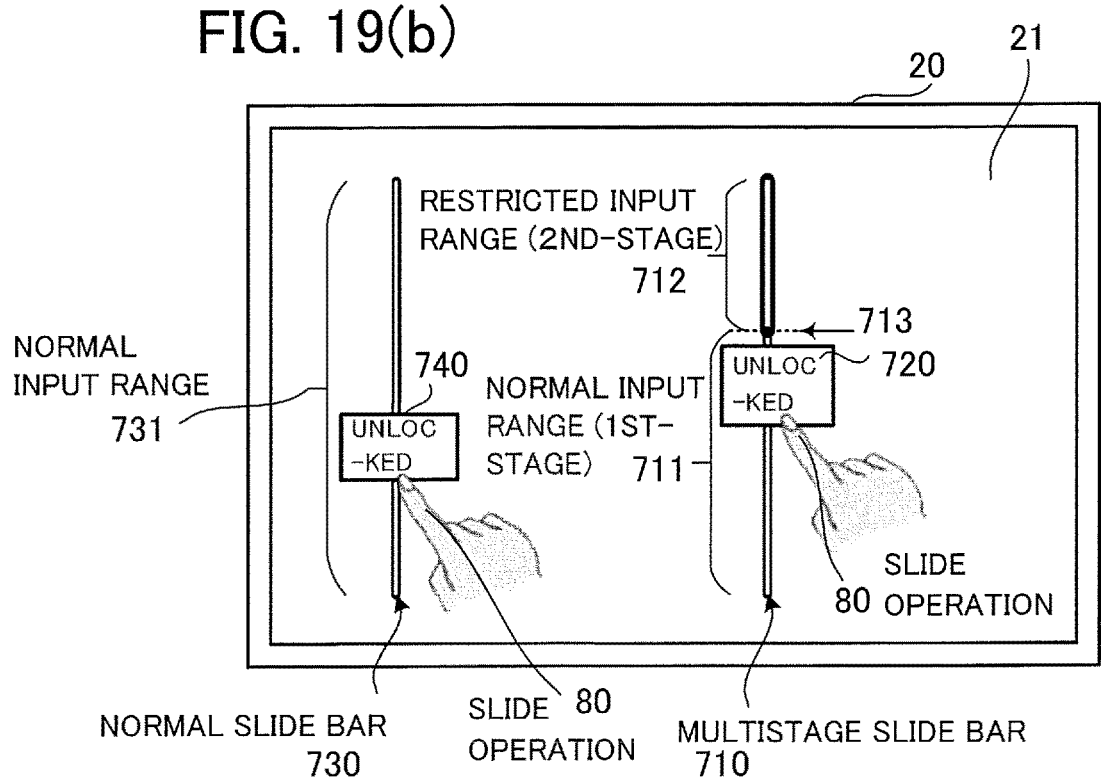

FIGS. 19(a) and 19(b) are diagrams showing touch operations using slide bars displayed on the operation surface 21 of the touch panel 20 of the touch panel device according to the seventh embodiment. A normal slide bar 730 and a multistage slide bar 710 are shown in FIGS. 19(a) and 19(b). FIG. 19(a) indicates that by touching a slider 720 or 740 once with the finger 80, the operator can change from a locked state (i.e., unusable state) in which the touch operation on a slide bar is invalid to an unlocked state (i.e., usable state) in which the touch operation on the slide bar is valid. Put another way, the touch panel device according to the seventh embodiment has the locked state in which the operation on the slide bar is disabled and the unlocked state in which the operation on the slide bar is permitted. FIG. 19(b) indicates that the operator can input a value corresponding to the position of the slider 720 or 740 by moving the slider of a slide bar in the unlocked state upward or downward with the finger 80.

In FIGS. 19(a) and 19(b), the slide bar on the left side is the normal slide bar 730, which is a slide bar on which no boundary value between input ranges is set. Thus, the whole range of the bar part of the normal slide bar 730 is a normal input range 731. When the slide bar is in the unlocked state, the operator can freely move the slider 740 with the finger 80 in the entire range of the normal input range 731.

In FIGS. 19(a) and 19(b), the slide bar on the right side is the multistage slide bar 710, which is a slide bar on which a boundary value 713 between input ranges is set. A first-stage part of the multistage slide bar 710 that is a part lower than the boundary value 713 is a normal input range 711. A second-stage part of the multistage slide bar 710 that is a part upper than the boundary value 713 is a restricted input range 712. When the slide bar is in the unlocked state, the operator can freely move the slider 720 with the finger 80 in the normal input range 711. The touch operation in the normal input range 711 is the first touch operation. However, only when the operator performs a predetermined restriction canceling operation when the slide bar is in the unlocked state, the operator can move the slider 720 in the restricted input range 712. The touch operation in the restricted input range 712 is the second touch operation.

FIG. 20 is a flowchart showing the operation of the touch panel device according to the seventh embodiment. The processes shown in FIG. 20 include processes of steps S704 to S707 in addition to the processes shown in FIG. 7. Except for the addition of the processes of the steps S704 to S707, the processes shown in FIG. 20 are the same as the processes shown in FIG. 7.

When the sequence shown in FIG. 20 starts, the pressure detection unit 120 is initialized in step S701, and the operation permission pressure setting unit 140 sets the threshold pressing force ThF of the second touch operation in step S702. In the next step S703, the operation judgment unit 130 acquires the position coordinates (x, y) of the touch operation and the press value Fp of the pressing force of the touch operation.

In step S704, the operation judgment unit 130 judges whether a touch operation on a locked region with a fingertip has been performed or not based on the input coordinates.

When the result of the judgment in the step S704 is NO, the operation judgment unit 130 in step S705 displays "LOCKED" indicating the locked state and returns the process to the step S703.

When the result of the judgment in the step S704 is YES, the operation judgment unit 130 in step S706 displays "UNLOCKED" indicating the unlocked state. Thereafter, the operation judgment unit 130 in step S707 performs the same processing as in the step S703.

In the next step S708, the operation judgment unit 130 judges whether or not the press value Fp of the pressing force is greater than the threshold pressing force ThF.

When the result of the judgment in the step S708 is NO, the operation judgment unit 130 in step S709 judges whether or not the touch operation is an operation in the range of the first-stage part (i.e., the normal input range 711 in FIGS. 19(a) and 19(b)).

When the result of the judgment in the step S709 is NO, the operation judgment unit 130 does not update the display of the slide bar 710 (e.g., movement of the slider 720 in the restricted input range 712 in FIGS. 19(a) and 19(b)) in step S711. When the result of the judgment in the step S709 is YES, the operation judgment unit 130 updates the display of the slide bar 710 (e.g., movement of the slider 720 in the normal input range 711 in FIGS. 19(a) and 19(b)) in step S710.

When the result of the judgment in the step S708 is YES, the operation judgment unit 130 in step S712 judges whether or not the touch operation is an operation in the restricted input range 712 as the range of the second-stage part.

When the result of the judgment in the step S712 is NO, the operation judgment unit 130 updates the display of the slide bar 710 (e.g., movement of the slider 720 in the normal input range 711 in FIGS. 19(a) and 19(b)) in step S713. When the result of the judgment in the step S712 is YES, the operation judgment unit 130 updates the display of the slide bar 710 (e.g., movement of the slider 720 in the restricted input range 712 in FIGS. 19(a) and 19(b)) in step S714.

As described above, in the touch panel device according to the seventh embodiment, the locked state in which the movement of the slider 720 is not permitted is provided and a touch operation with a pressing force at a press value Fp greater than the threshold pressing force ThF is used as the condition for enabling the movement of the slider 720 in the restricted input range 712, and thus the occurrence of the erroneous operation in which the second touch operation is carried out against the operator's intention can be avoided.

(8) Eighth Embodiment

A touch panel device according to an eighth embodiment differs from the touch panel device according to the first embodiment in the operation components displayed on the operation surface 21 of the touch panel 20 and the method of the touch operation. Except for these features, the eighth embodiment is the same as the first embodiment. Therefore, FIG. 1 to FIG. 3 will also be referred to in the description of the eighth embodiment.

Figure 21:
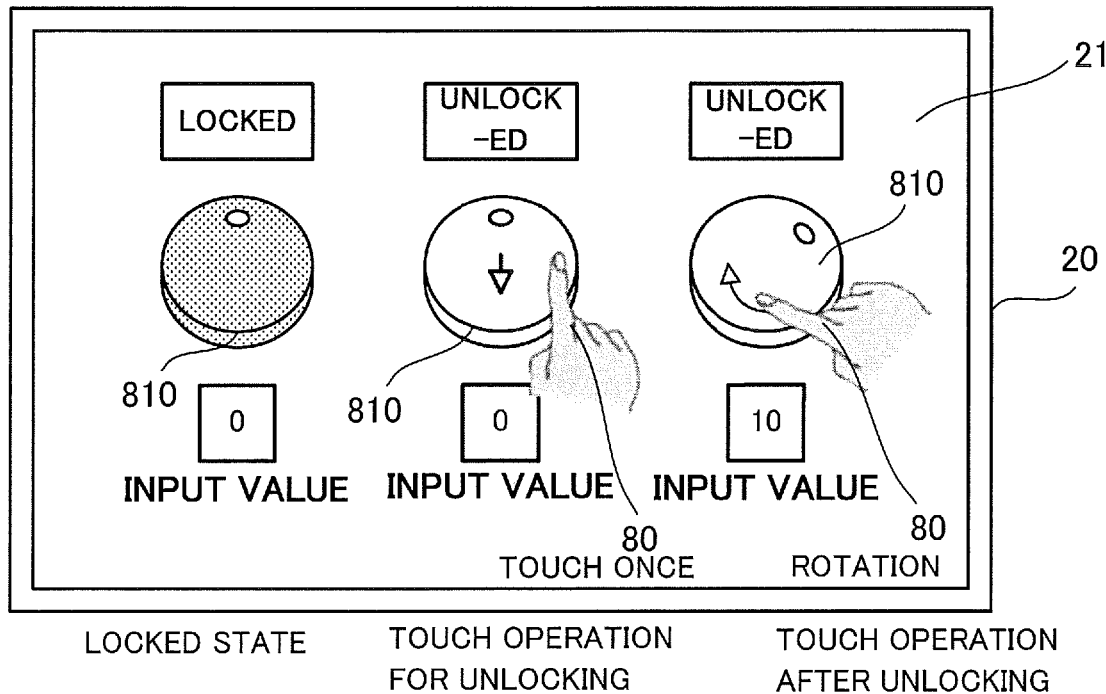
FIG. 21 is a diagram showing touch operations using a dial button displayed on an operation surface of a touch panel of a touch panel device according to an eighth embodiment of the present invention.

FIG. 21 is a diagram showing touch operations using a dial button 810 displayed on the operation surface 21 of the touch panel 20 of the touch panel device according to the eighth embodiment. FIG. 21 shows a locked state in which the dial button 810 cannot be rotated (left side), a touch operation for canceling the locked state of the dial button 810 (center), and a touch operation for rotating the dial button 810 in the unlocked state.

Figure 22:
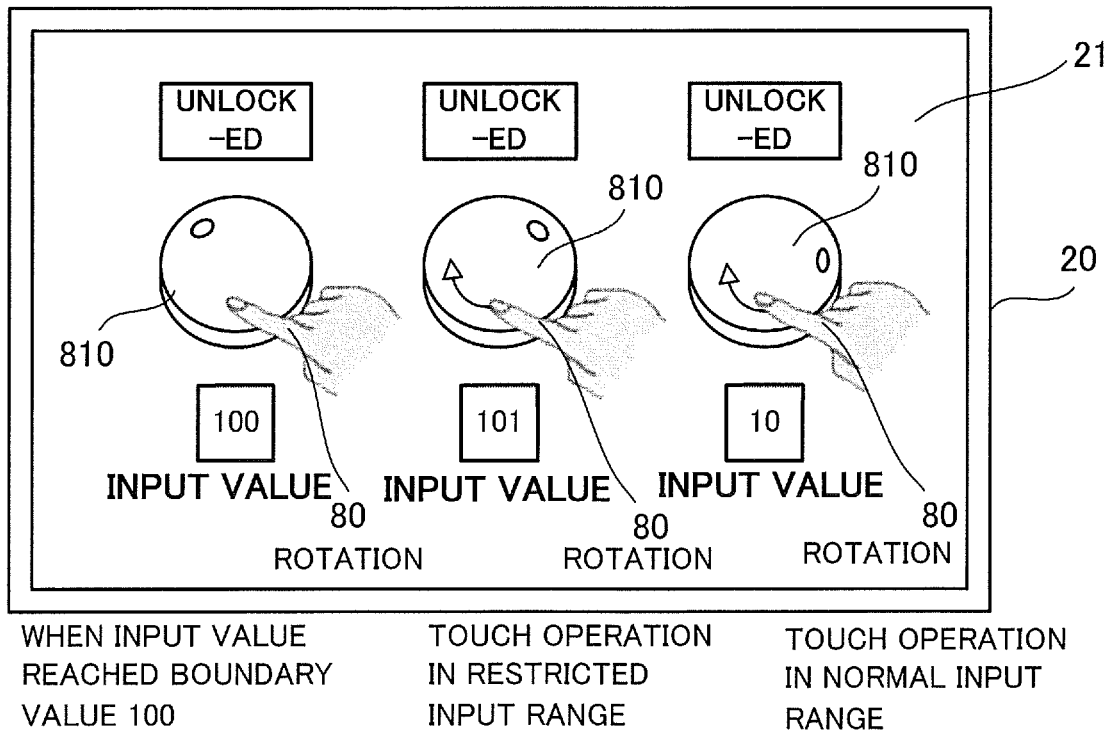
FIG. 22 is a diagram showing touch operations using the dial button displayed on the operation surface of the touch panel of the touch panel device according to the eighth embodiment.

FIG. 22 is a diagram showing touch operations using the dial button 810 displayed on the operation surface 21 of the touch panel 20 of the touch panel device according to the eighth embodiment. The dial button 810 on the left side of FIG. 22 shows a state in which the input value has reached a boundary value (upper limit value of the normal input range) "100" and thereafter the dial button 810 does not rotate even when a rotation operation is performed with a finger. The dial button 810 at the center of FIG. 22 indicates that after the input value reaches the boundary value (upper limit value of the normal input range) "100", a rotation operation is performed with the finger 80 with a press value Fp greater than the threshold pressing force ThF, and accordingly input in the restricted input range becomes possible. In this case, the input value is increased by performing the rotation operation with a press value Fp greater than the threshold pressing force ThF. Incidentally, the increment of the input value per rotation (i.e., increasing rate) may be set lower than that in the normal input range. The dial button 810 on the right side of FIG. 22 indicates that the input value has not reached the boundary value (upper limit value of the normal input range) "100", if a clockwise rotation operation is performed with a finger, the dial button 810 rotates clockwise and the input value increases, and if a counterclockwise rotation operation is performed, the dial button 810 rotates counterclockwise and the input value decreases.

Figure 23:
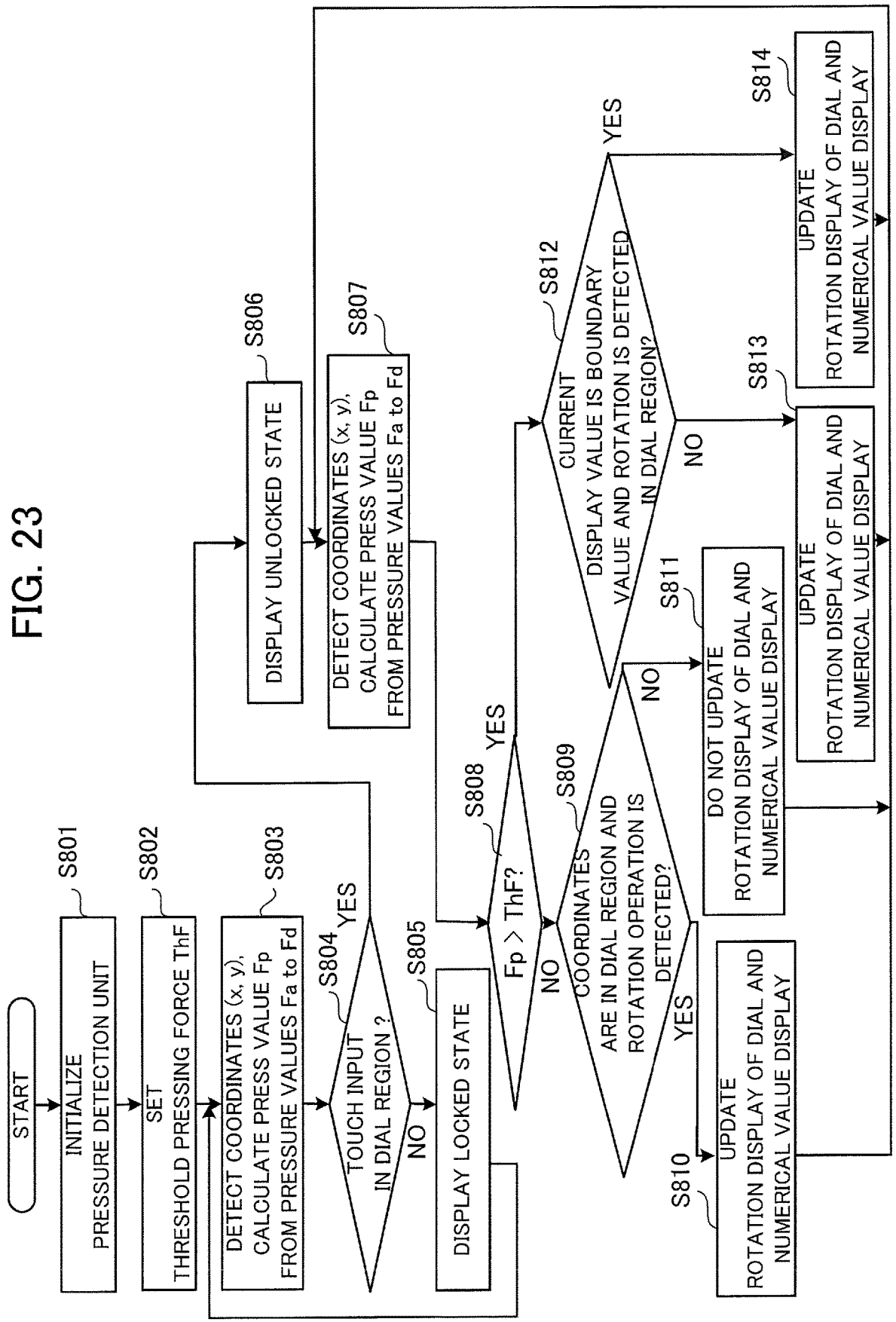
FIG. 23 is a flowchart showing the operation of the touch panel device according to the eighth embodiment.

FIG. 23 is a flowchart showing the operation of the touch panel device 8 according to the eighth embodiment. When the sequence shown in FIG. 23 starts, the pressure detection unit 120 is initialized in step S801, and the operation permission pressure setting unit 140 sets the threshold pressing force ThF of the second touch operation in step S802. In the next step S803, the operation judgment unit 130 acquires the position coordinates (x, y) of the touch operation and the press value Fp of the pressing force of the touch operation.

In step S804, the operation judgment unit 130 judges whether a touch operation on a locked region with a fingertip has been performed or not based on the input coordinates.

When the result of the judgment in the step S804 is NO, the operation judgment unit 130 in step S805 judges that the dial button 810 is in the locked state and displays "LOCKED", and returns the process to the step S803.

When the result of the judgment in the step S804 is YES, the operation judgment unit 130 in step S806 judges that the dial button 810 is in the unlocked state and displays "UNLOCKED". Thereafter, the operation judgment unit 130 in step S807 performs the same processing as in the step S803.

In the next step S808, the operation judgment unit 130 judges whether or not the press value Fp of the pressing force is greater than the threshold pressing force ThF.

When the result of the judgment in the step S808 is NO, the operation judgment unit 130 in step S809 judges whether or not the coordinates (x, y) are in a dial region and the rotation operation is detected.

When the result of the judgment in the step S809 is NO, the operation judgment unit 130 does not update the display of the dial button 810 (e.g., update of the rotation display of the dial button 810 and the numerical value display in FIG. 22) in step S811. When the result of the judgment in the step S809 is YES, the operation judgment unit 130 updates the display of the dial button 810 (e.g., update of the rotation display of the dial button 810 and the numerical value display in FIG. 22) in step S810.

When the result of the judgment in the step S808 is YES, the operation judgment unit 130 in step S812 judges whether or a current display value is the boundary value and the rotation operation is in the dial region (i.e., a region of the dial button 810 in FIG. 22).

When the result of the judgment in the step S812 is NO, the operation judgment unit 130 updates the display of the dial button 810 (e.g., update of the rotation display of the dial button 810 and the numerical value display in FIG. 22) in step S813. When the result of the judgment in the step S812 is YES, the operation judgment unit 130 updates the display of the dial button 810 in step S814.

As described above, in the touch panel device according to the eighth embodiment, the locked state of the dial button 810 is provided, and in the unlocked state of the dial button 810, by performing a touch operation with a pressing force at a press value Fp greater than the threshold pressing force ThF, the input value of the dial button 810 can be changed in the restricted input range, by which the occurrence of the erroneous operation in which the second touch operation is carried out against the operator's intention can be avoided.

(9) Ninth Embodiment

A touch panel device according to a ninth embodiment differs from the touch panel device according to the first embodiment in the operation components displayed on the operation surface 21 of the touch panel 20 and the method of the touch operation. Except for these features, the ninth embodiment is the same as the first embodiment. Therefore, FIG. 1 to FIG. 3 will also be referred to in the description of the ninth embodiment.

Figure 24:
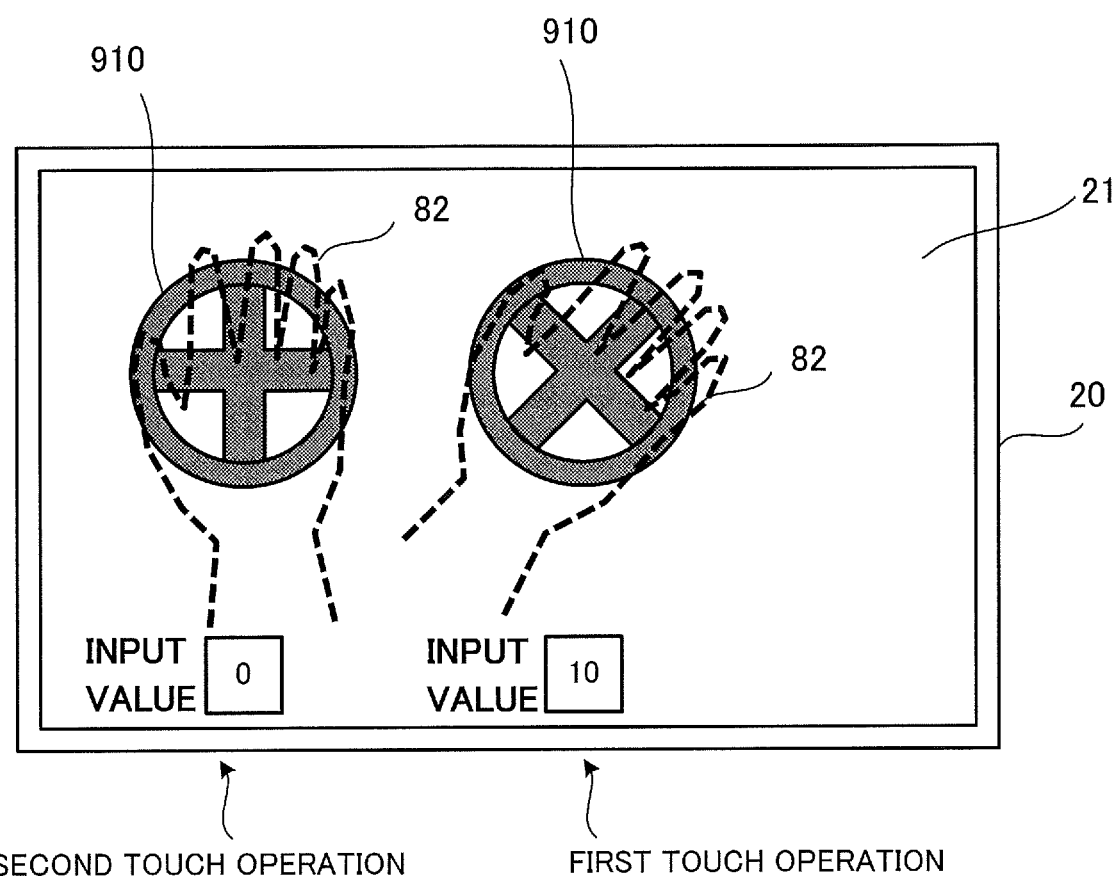
FIG. 24 is a diagram showing touch operations using a valve displayed on an operation surface of a touch panel of a touch panel device according to a ninth embodiment of the present invention.

FIG. 24 is a diagram showing touch operations using a valve 910 displayed on the operation surface 21 of the touch panel 20 of the touch panel device according to the ninth embodiment. The operator performs a rotation operation on the valve 910 displayed on the operation surface 21 of the touch panel 20 while pressing against the operation surface 21 with a plurality of fingers like rotating an actual valve, for example. Similarly to the actual valve opening operation, during the rotation from a value of the initial position to a certain input value (fixed value), a rotation operation on the valve 910 is performed while the valve 910 is pressed with a pressing force of a press value Fp greater than threshold pressing force ThF (i.e., the second touch operation), and after the number of times of the rotation of the valve reaches and exceeds the certain value, a rotation operation is performed while the valve is pressed with a pressing force of a press value Fp less than or equal to the threshold pressing force ThF (i.e., the first touch operation). Namely, the operation of rotating the valve a certain number of times from the initial position is the second operation, the operation after rotations of the certain number of times is the first operation, and the controller judges that the second operation information corresponding to the second touch operation is valid when the second touch operation of rotating the valve while pressing the valve with a pressing force of a press value Fp greater than the threshold pressing force ThF is performed.

Figure 25:
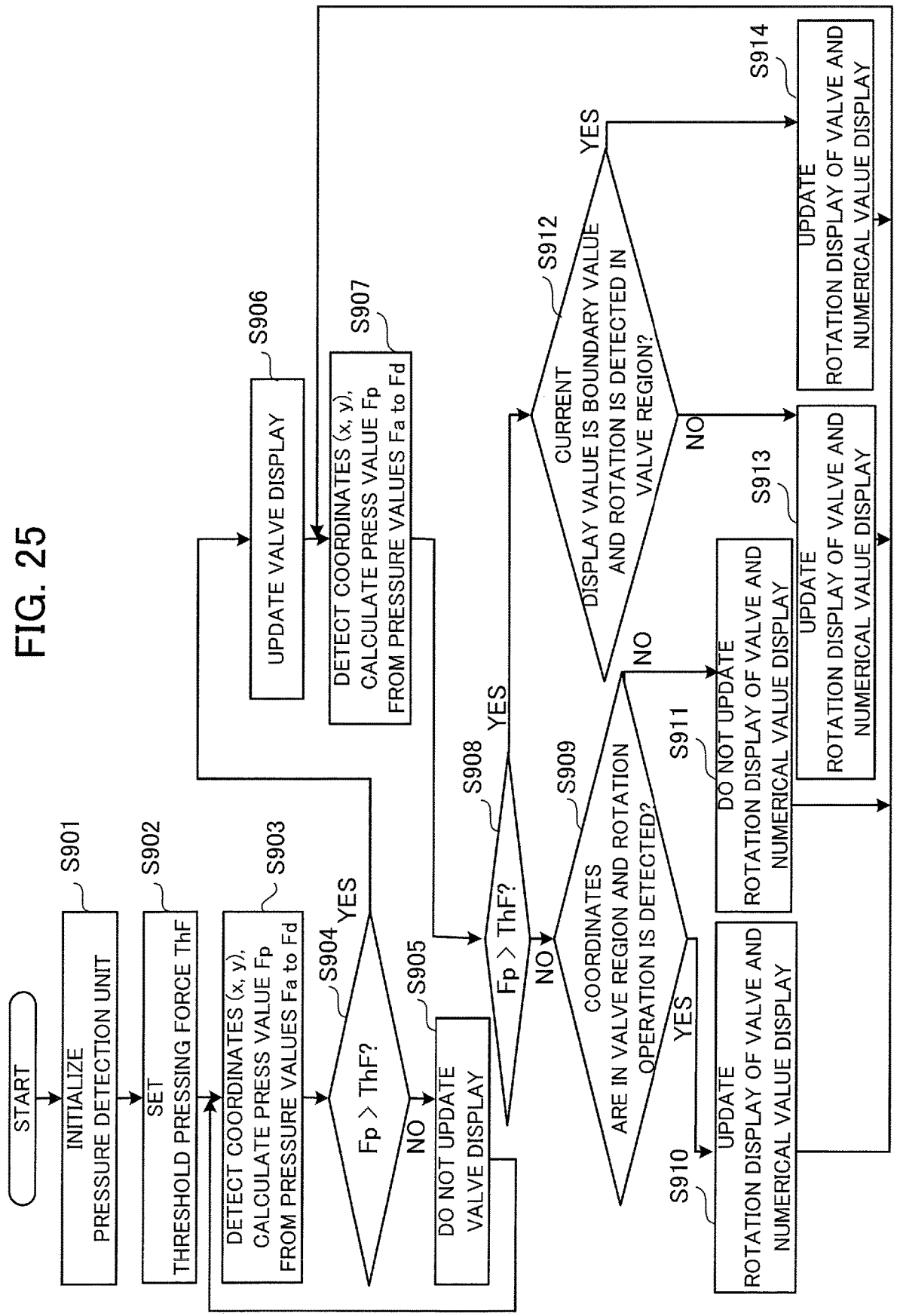
FIG. 25 is a flowchart showing the operation of the touch panel device according to the ninth embodiment.

FIG. 25 is a flowchart showing the operation of the touch panel device 9 according to the ninth embodiment. When the sequence shown in FIG. 25 starts, the pressure detection unit 120 is initialized in step S901, and the operation permission pressure setting unit 140 sets the threshold pressing force ThF of the second touch operation in step S902. In the next step S903, the operation judgment unit 130 acquires the position coordinates (x, y) of the touch operation and the press value Fp of the pressing force of the touch operation.

In step S904, the operation judgment unit 130 judges whether or not the press value Fp of the pressing force is greater than the threshold pressing force ThF.

When the result of the judgment in the step S904 is NO, the operation judgment unit 130 does not update the valve display in step S905 and returns the process to the step S903.

When the result of the judgment in the step S904 is YES, the operation judgment unit 130 updates the valve display in step S906. Thereafter, the operation judgment unit 130 in step S907 performs the same processing as in the step S903.

In the next step S908, the operation judgment unit 130 judges whether or not the press value Fp of the pressing force is greater than the threshold pressing force ThF.

When the result of the judgment in the step S908 is NO, the operation judgment unit 130 in step S909 judges whether or not the coordinates of the touch operation are in the display region of the valve and a rotation operation on the valve has been performed.

When the result of the judgment in the step S909 is NO, the operation judgment unit 130 in step S911 does not update the display of the valve rotation as and the numerical value display.

When the result of the judgment in the step S909 is YES, the operation judgment unit 130 updates the display of the valve rotation and the numerical value display in step S910.

When the result of the judgment in the step S908 is YES, the operation judgment unit 130 in step S912 judges whether or not the current display value is the boundary value and rotation in the display region of the valve is detected.

When the result of the judgment in the step S912 is NO, the operation judgment unit 130 updates the display of the valve 910 and updates the display value in step S913. When the result of the judgment in the step S912 is YES, the operation judgment unit 130 updates the display of the valve 910 and updates the display value in step S914.

As described above, in the touch panel device according to the ninth embodiment, the restricted input range requiring pressing force at a great press value Fp for the rotation operation on the valve 910 is provided, and the input value of the valve 910 is changed by performing a touch operation in the restricted input range with a pressing force at a press value Fp greater than the threshold pressing force ThF, by which the occurrence of the erroneous operation in which the second touch operation is carried out against the operator's intention can be avoided.

(10) Tenth Embodiment

A touch panel device according to a tenth embodiment differs from the touch panel device according to the first embodiment in the operation components displayed on the operation surface 21 of the touch panel 20 and the method of the touch operation. Except for these features, the tenth embodiment is the same as the first embodiment. Therefore, FIG. 1 to FIG. 3 will also be referred to in the description of the tenth embodiment.

Figure 26A:
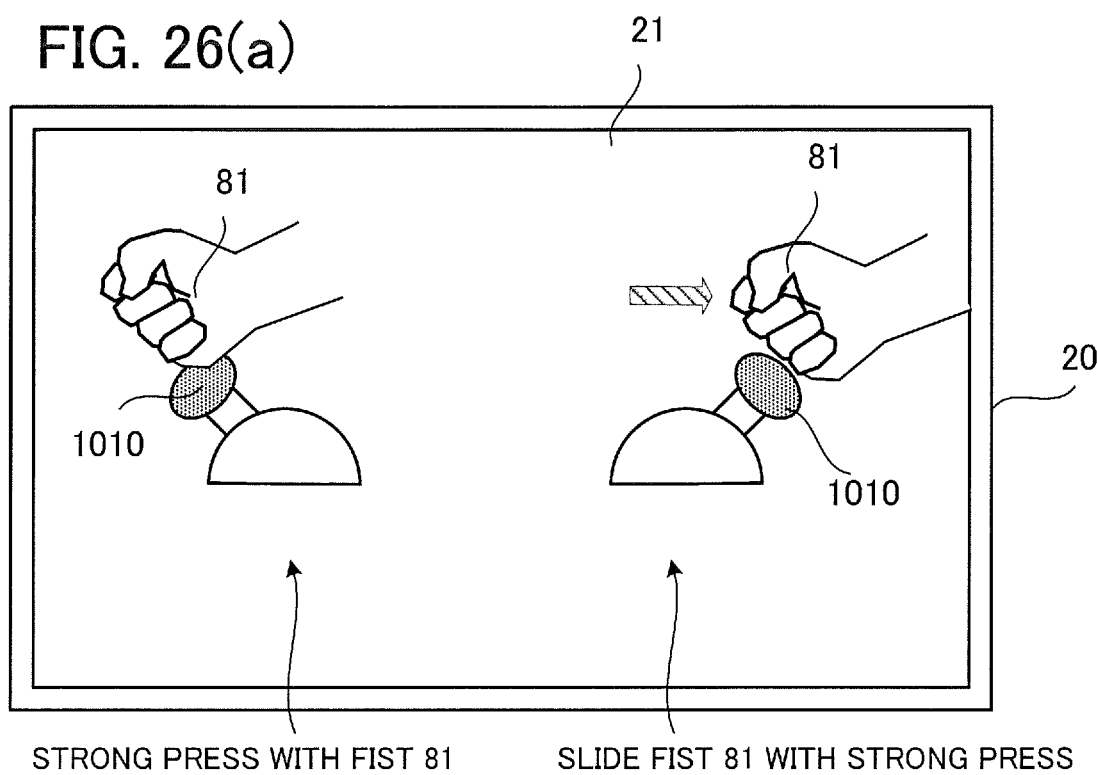
FIGS. 26(a) and 26(b) are diagrams showing touch operations using a lever displayed on an operation surface of a touch panel of a touch panel device according to a tenth embodiment of the present invention.
Figure 26B:
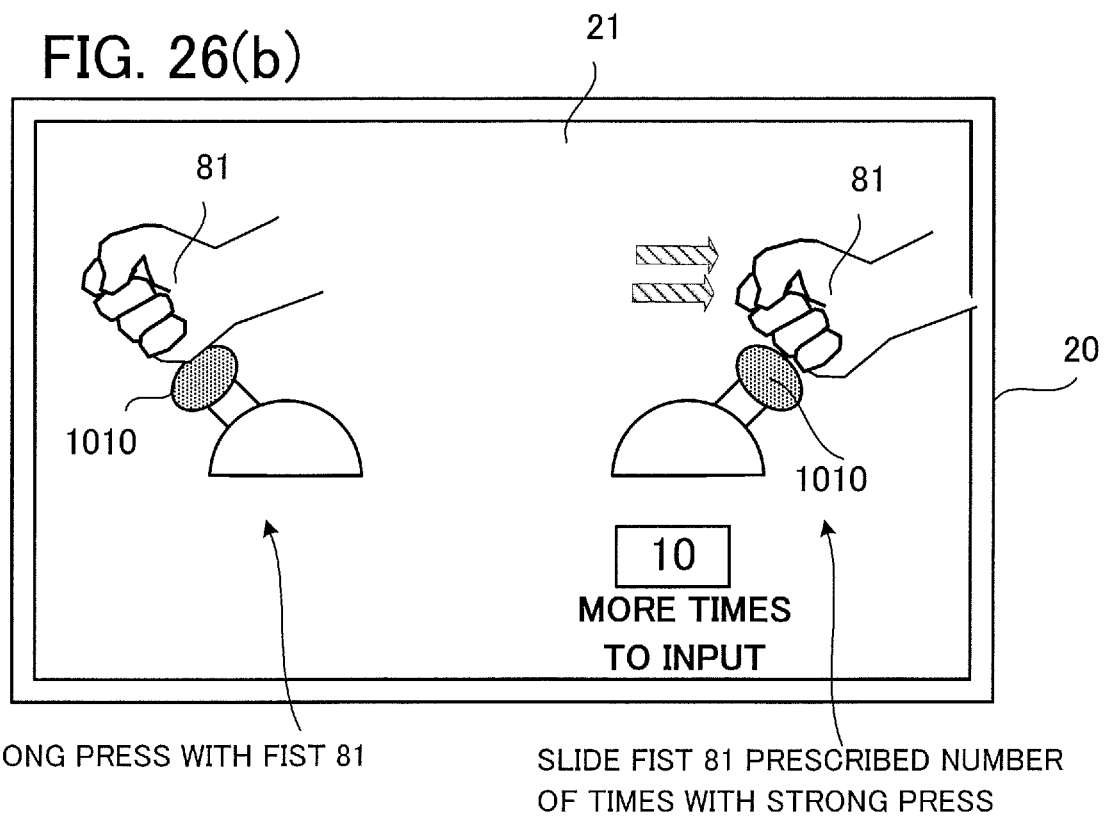

FIGS. 26(*a*) and 26(*b*) are diagrams showing touch operations using a lever 1010 displayed on the operation surface 21 of the touch panel 20 of the touch panel device according to the tenth embodiment. As shown in FIGS. 26(*a*) and 26(*b*), the lever 1010 is displayed on the touch panel 20, and in the touch operation, the lever 1010 operates and the lever display is updated only when a slide operation is performed on the operation surface 21 of the touch panel 20 while the press surface is pressed with a pressing force at a press value Fp greater than the threshold pressing force ThF.

FIG. 26(*a*) shows an operation in which the operator slides a fist 81 while pressing the screen with the fist 81. FIG. 26(*b*) shows that the lever 1010 is set to operate only when the fist 81 is slid a predetermined number of times (e.g., multiple times) and thus an erroneous operation is prevented. In these cases, it is possible to set the lever operation from "ON" to "OFF" as the normal input operation and the lever operation from "OFF" to "ON" as the restricted input operation, for example.

Figure 27:
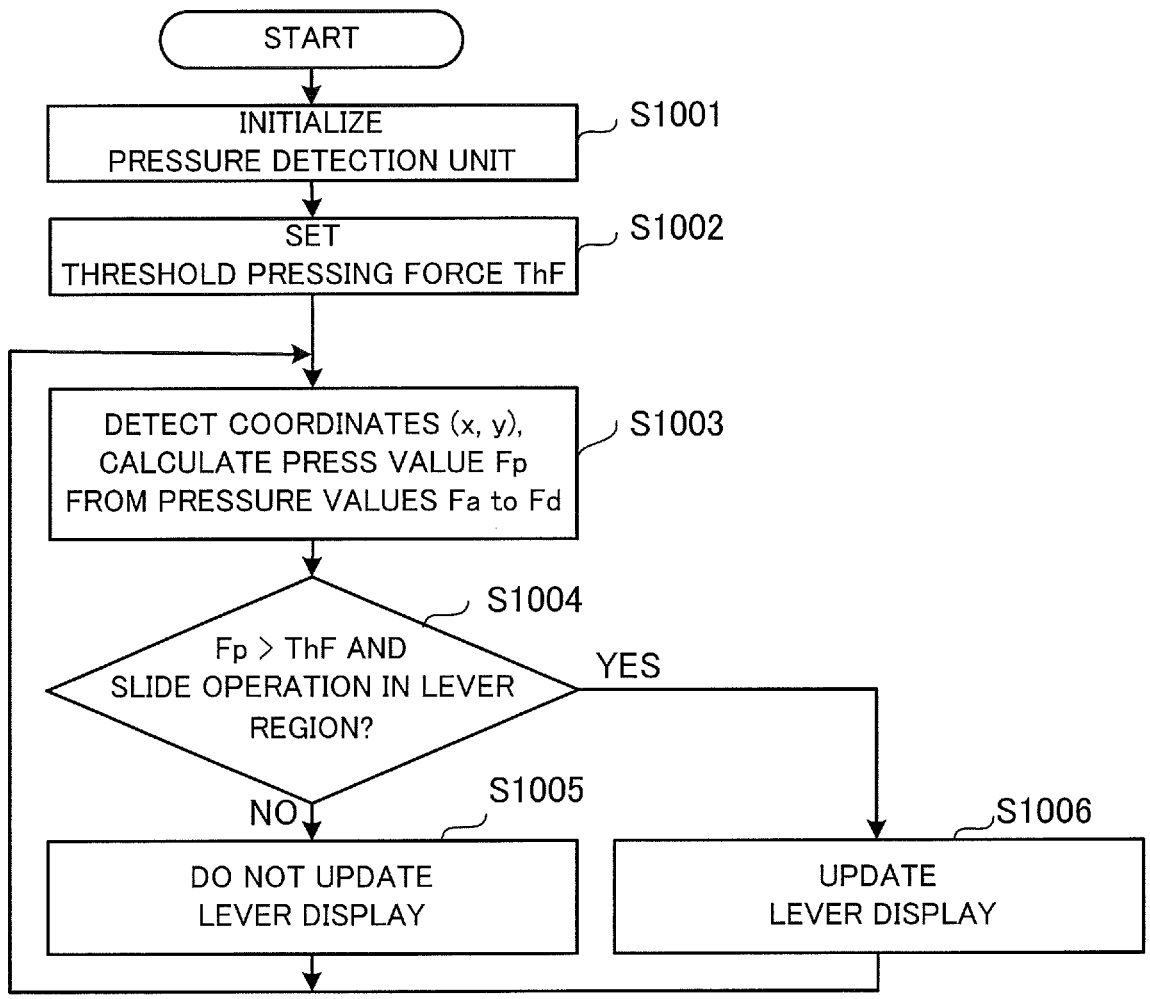
FIG. 27 is a flowchart showing the operation of the touch panel device according to the tenth embodiment.

FIG. 27 is a flowchart showing the operation of the touch panel device (FIG. 26(*a*)) according to the tenth embodiment. When the sequence shown in FIG. 27 starts, the pressure detection unit 120 is initialized in step S1001, and the operation permission pressure setting unit 140 sets the threshold pressing force ThF of the second touch operation in step S1002. In the next step S1003, the operation judgment unit 130 acquires the position coordinates (x, y) of the touch operation and the press value Fp of the pressing force of the touch operation.

In the next step S1004, the operation judgment unit 130 judges whether or not the press value Fp is greater than the threshold pressing force ThF and a slide operation has been performed in the display region of the lever.

When the result of the judgment in the step S1004 is NO, the operation judgment unit 130 does not update the lever display in step S1005.

When the result of the judgment in the step S1004 is YES, the operation judgment unit 130 updates the lever display in step S1007.

As described above, in the touch panel device shown in FIG. 26(*a*), a pressing force at a press value Fp greater than the threshold pressing force ThF is used as the condition for enabling the lever operation, and thus the occurrence of the erroneous operation in which the second touch operation is carried out against the operator's intention can be avoided.

Figure 28:
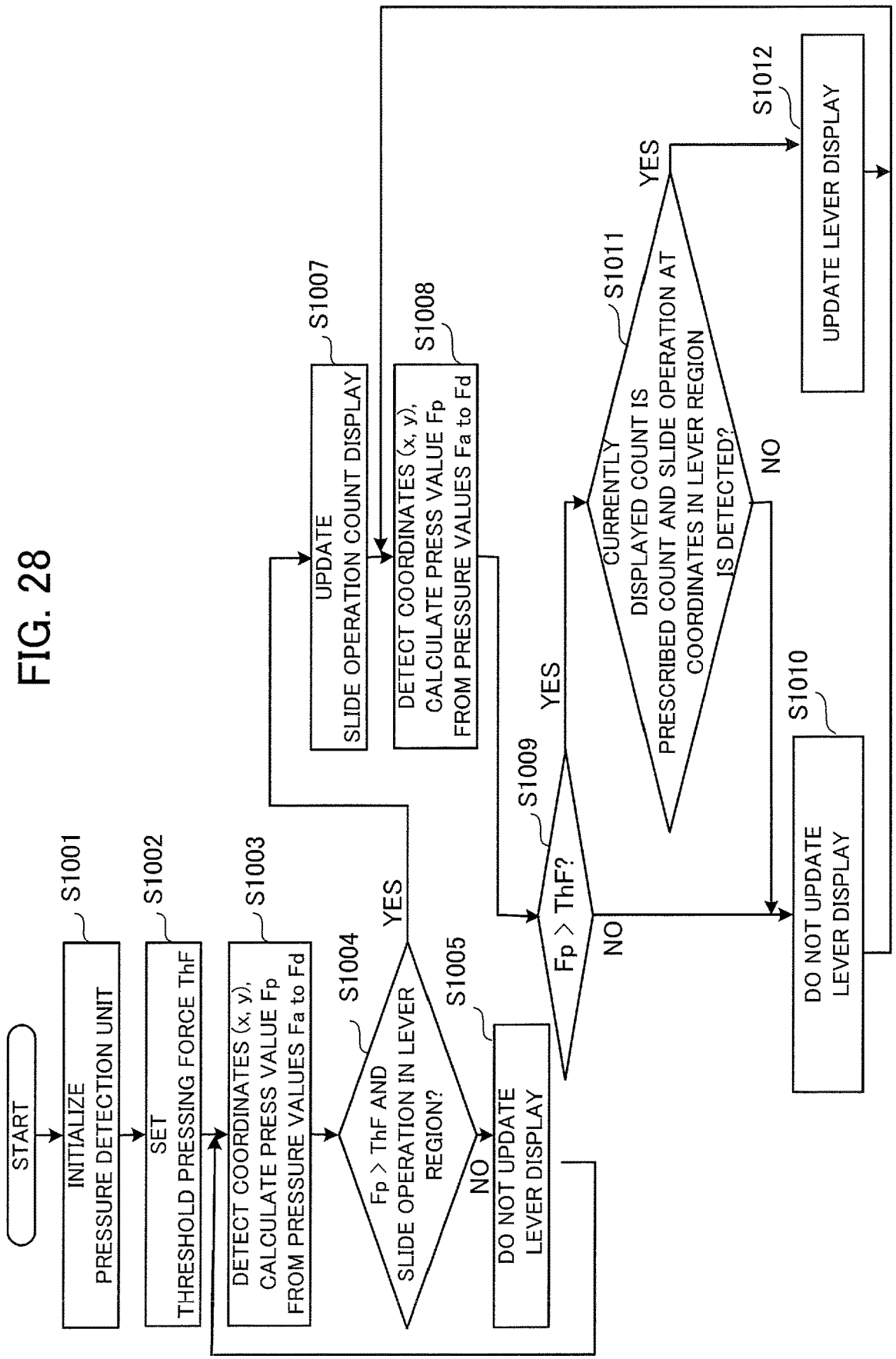
FIG. 28 is a flowchart showing the operation of a touch panel device according to a modification of the tenth embodiment.

FIG. 28 is a flowchart showing the operation of the touch panel device 10 (FIG. 26(*b*)) according to the tenth embodiment. In FIG. 28, each process step identical or corresponding to a process step shown in FIG. 27 is assigned the same step number as that shown in FIG. 27.

When the result of the judgment in the step S1004 is YES, the operation judgment unit 130 in step S1007 updates the display of the number of times of the slide operation. In the next step S1008, the operation judgment unit 130 acquires the position coordinates (x, y) of the touch operation and the press value Fp of the pressing force of the touch operation.

In the next step S1009, the operation judgment unit 130 judges whether or not the press value Fp is greater than the threshold pressing force ThF.

When the result of the judgment in the step S1009 is NO, the operation judgment unit 130 does not update the lever display in step S1010.

When the result of the judgment in the step S1009 is YES, the operation judgment unit 130 in step S1011 judges whether or not the currently displayed number of times of the lever operation is a prescribed number of times and a slide operation at coordinates in the lever region is detected.

When the result of the judgment in the step S1011 is NO, the operation judgment unit 130 does not update the lever display in the step S1010.

When the result of the judgment in the step S1011 is YES, the operation judgment unit 130 updates the lever display in step S1012.

As described above, in the touch panel device shown in FIG. 26(*b*), a pressing force at a press value Fp greater than the threshold pressing force ThF is used as the condition for enabling the lever operation, and thus the occurrence of the erroneous operation in which the second touch operation is carried out against the operator's intention can be avoided.

(11) Eleventh Embodiment

A touch panel device according to an eleventh embodiment differs from the touch panel device according to the first embodiment in the operation components displayed on the operation surface 21 of the touch panel 20 and the method of the touch operation. Except for these features, the eleventh embodiment is the same as the first embodiment. Therefore, FIG. 1 to FIG. 3 will also be referred to in the description of the eleventh embodiment.

Figure 29A:
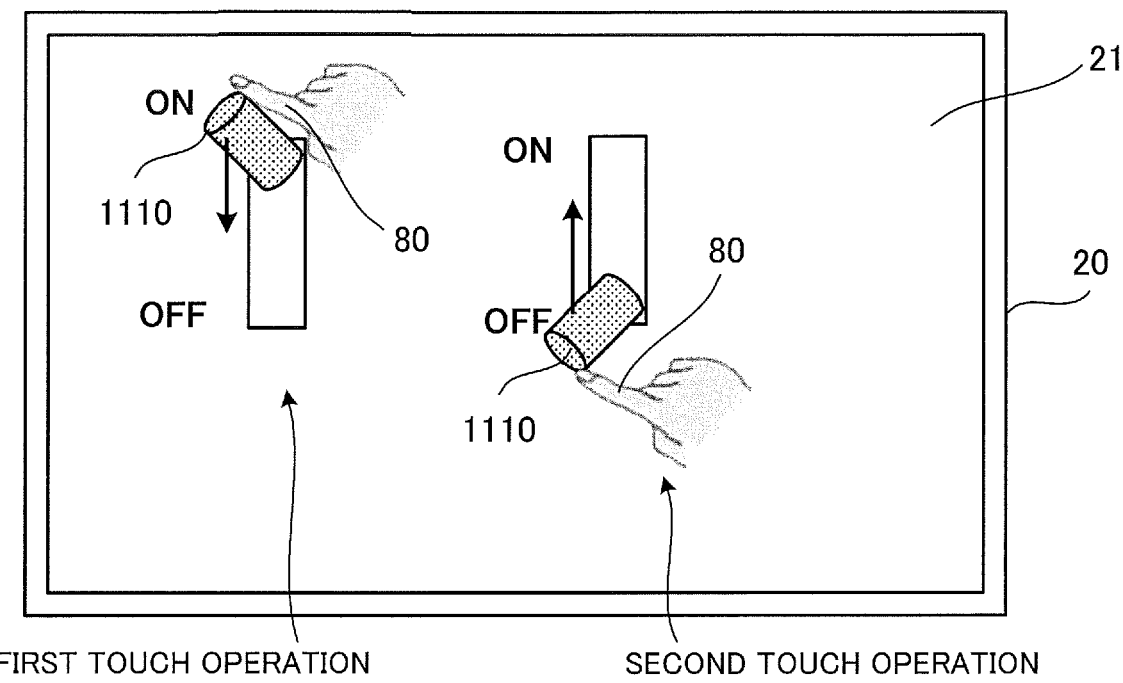
FIGS. 29(a) and 29(b) are diagrams showing touch operations using a breaker switch displayed on an operation surface of a touch panel of a touch panel device according to an eleventh embodiment of the present invention.

FIGS. 29(*a*) and 29(*b*) are diagrams showing touch operations using a breaker switch 1110 displayed on the operation surface 21 of the touch panel 20 of the touch panel device according to the eleventh embodiment. FIG. 29(*a*) shows an example in which a touch operation of moving the breaker switch 1110 from an ON state "ON" to an OFF state "OFF" is the first touch operation and a touch operation of moving the breaker switch 1110 from "OFF" to "ON" is the second touch operation of pressing with a press value greater than the threshold pressing force ThF. FIG. 29(*b*) shows an example in which a touch operation of moving the breaker switch 1110 from "ON" to "OFF" is the first touch operation and a touch operation of moving the breaker switch 1110 from "OFF" to "ON" is the second touch operation of performing the slide operation a prescribed number of times or more while pressing of a press value greater than the threshold pressing force ThF.

By providing with the breaker switch 1110 operated easily in one direction (from ON to OFF) through the slide operation and operated in the other direction (from OFF to ON) when the slide operation is performed once with pressing of a press value greater than the threshold pressing force ThF, an erroneous operation is prevented.

Figure 29B:
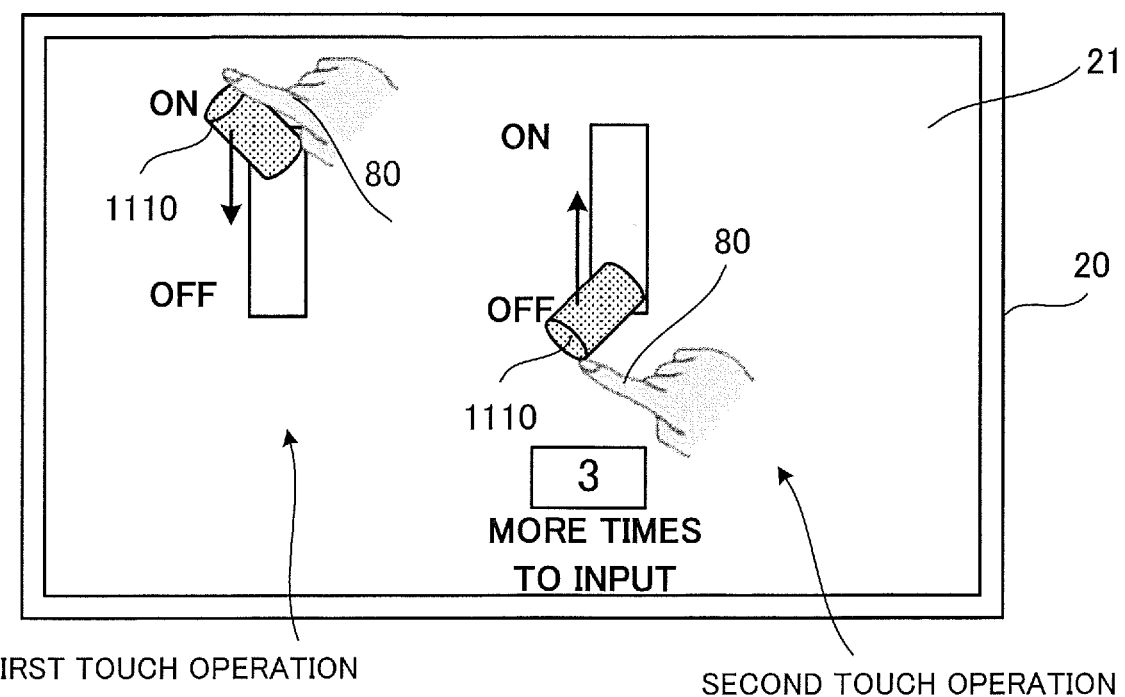
Figure 30:
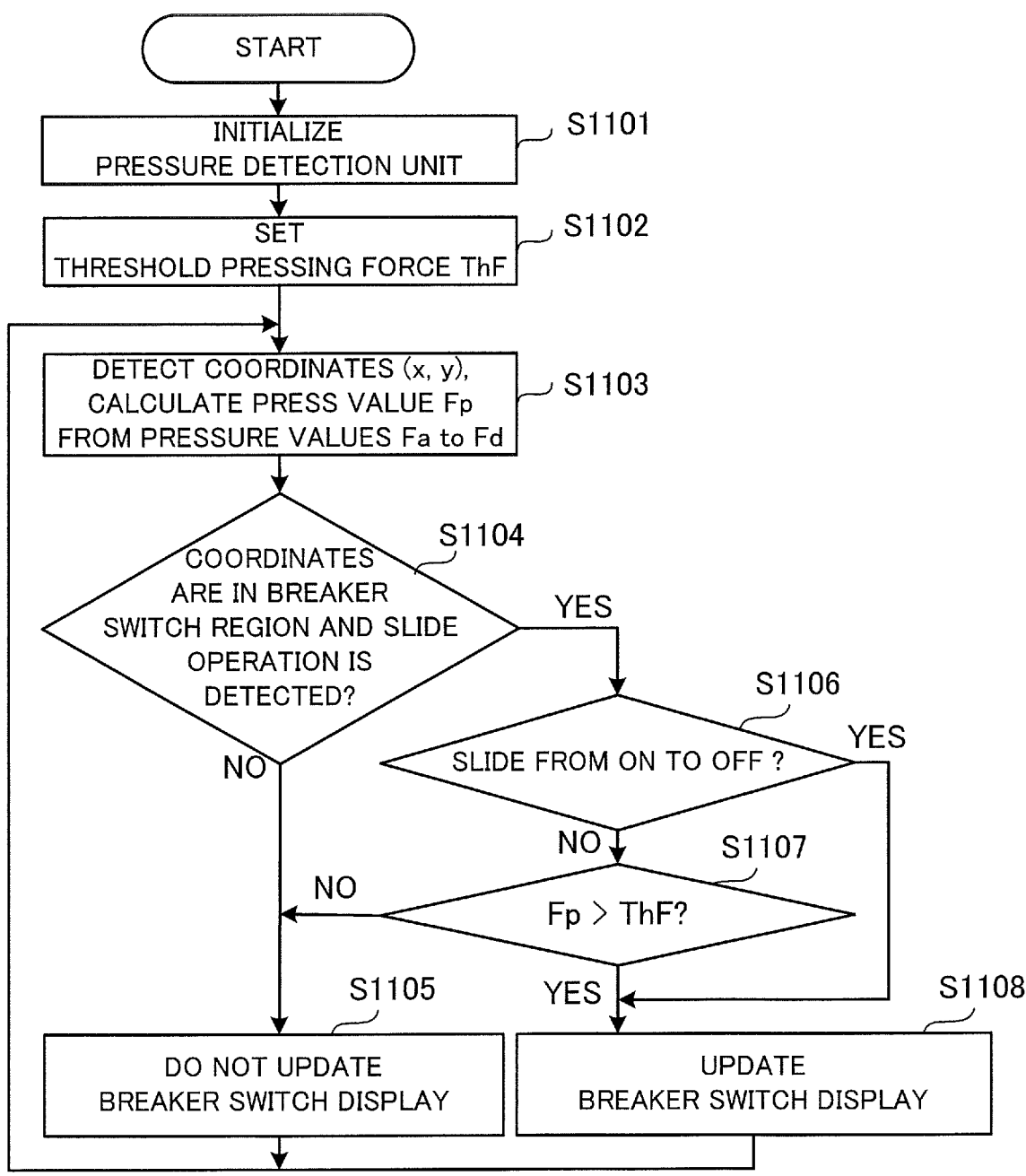
FIG. 30 is a flowchart showing the operation of the touch panel device according to the eleventh embodiment.

FIG. 30 is a flowchart showing the operation of the touch panel device in FIG. 29(*a*). When the sequence shown in FIG. 30 starts, the pressure detection unit 120 is initialized in step S1101, and the operation permission pressure setting unit 140 sets the threshold pressing force ThF of the second touch operation in step S1102. In the next step S1103, the operation judgment unit 130 acquires the position coordinates (x, y) of the touch operation and the press value Fp of the pressing force of the touch operation.

In the next step S1104, the operation judgment unit 130 judges whether or not the coordinates are in the display region of the breaker switch and a slide operation for switching the breaker switch has been performed.

When the result of the judgment in the step S1104 is NO, the operation judgment unit 130 does not update the breaker switch display in step S1105.

When the result of the judgment in the step S1104 is YES, the operation judgment unit 130 in step S1106 judges whether or not the lever display has been slid from "ON" to "OFF".

When the result of the judgment in the step S1106 is YES, the operation judgment unit 130 updates the display of the breaker switch in step S1108.

When the result of the judgment in the step S1106 is NO, the operation judgment unit 130 in step S1107 judges whether or not the press value Fp is greater than the threshold pressing force ThF.

When the result of the judgment in the step S1107 is NO, the operation judgment unit 130 does not update the display of the breaker switch in the step S1105. When the result of the judgment in the step S1107 is YES, the operation judgment unit 130 updates the display of the breaker switch in the step S1108.

As described above, with the touch panel device shown in FIG. 29(a), the occurrence of the erroneous operation in which the second touch operation is carried out against the operator's intention can be avoided.

Figure 31:
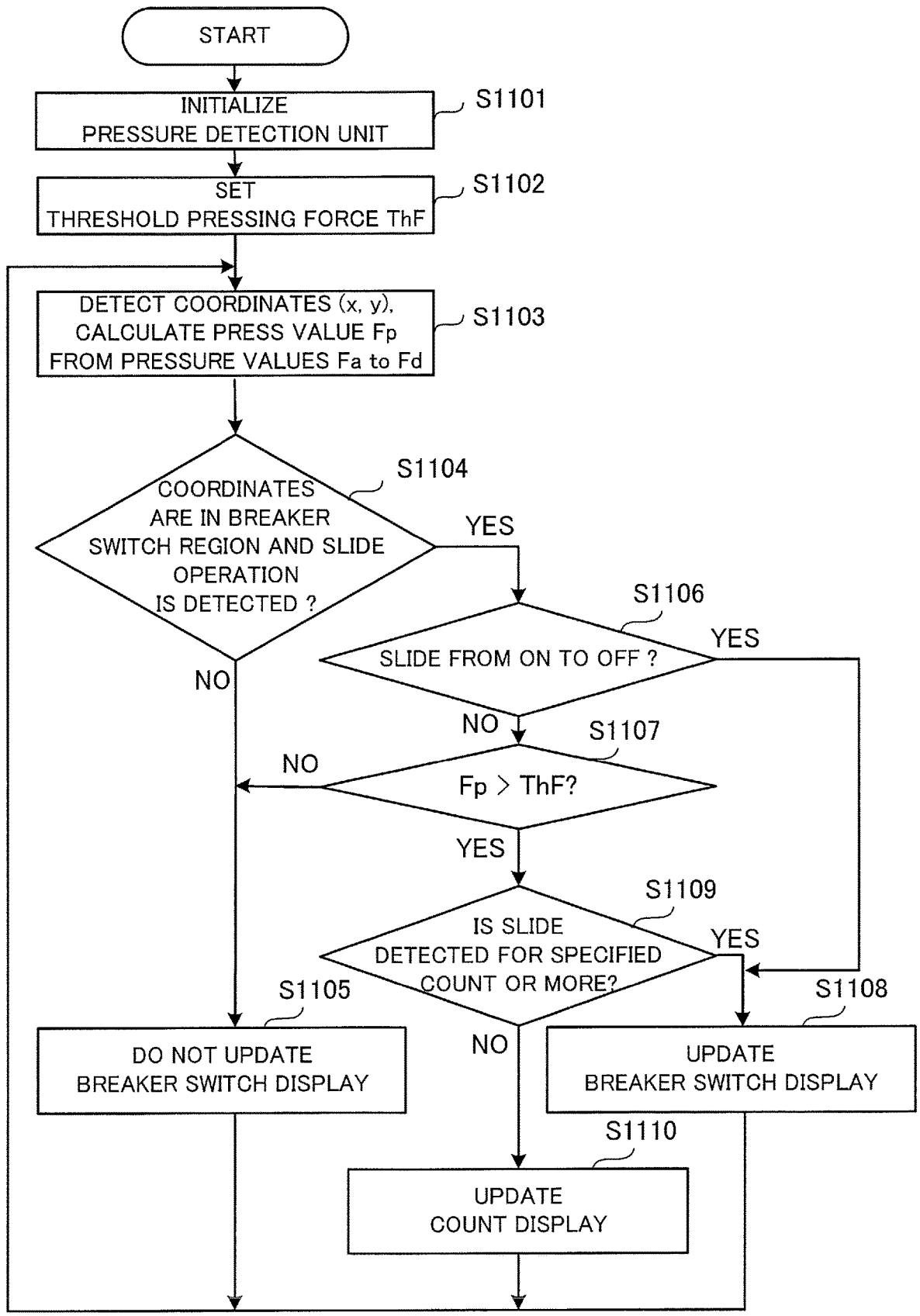
FIG. 31 is a flowchart showing the operation of a touch panel device according to a modification of the eleventh embodiment.

FIG. 31 is a flowchart showing the operation of the touch panel device in FIG. 29(b). In FIG. 31, each process step identical or corresponding to a process step shown in FIG. 30 is assigned the same step number as that shown in FIG. 30. FIG. 31 differs from FIG. 30 in that step S1109 and step S1110 are added. In this case, as indicated by the steps S1109 and S1108, the breaker switch display is updated and the state of the breaker switch is switched when the slide operation is performed a certain number of times (numerical value count) greater than or equal to a designated count. When the judgment in the step S1109 is NO, the slide count display is updated.

As described above, in the touch panel device according to the eleventh embodiment, by providing with the breaker switch 1110 operated easily in one direction (from ON to OFF) through the slide operation and operated in the other direction (from OFF to ON) when the slide operation is performed a designated number of times (multiple times) with pressing of a press value greater than the threshold pressing force ThF, an erroneous operation is prevented.

(12) Twelfth Embodiment

A touch panel device according to a twelfth embodiment differs from the touch panel device according to the first embodiment in the operation components displayed on the operation surface 21 of the touch panel 20 and the method of the touch operation. Except for these features, the twelfth embodiment is the same as the first embodiment. Therefore, FIG. 1 to FIG. 3 will also be referred to in the description of the twelfth embodiment.

Figure 32:
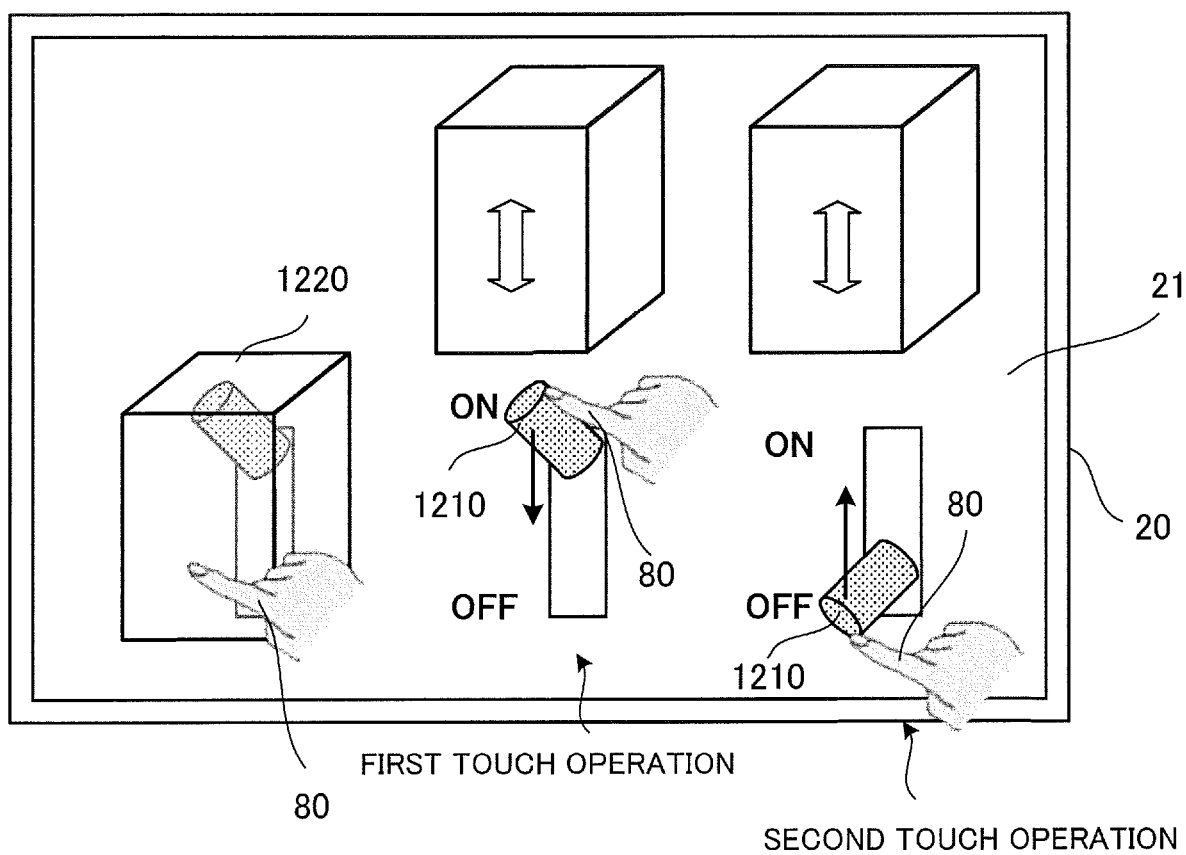
FIG. 32 is a diagram showing touch operations using a breaker switch with a cover displayed on an operation surface of a touch panel of a touch panel device according to a twelfth embodiment of the present invention.

FIG. 32 is a diagram showing touch operations using a breaker switch 1210 with a cover 1220 displayed on the operation surface 21 of the touch panel 20 of the touch panel device according to the twelfth embodiment. To operate the breaker switch 1210, the operator performs a slide operation once in the region of the cover 1220 to change the state of the cover 1220 to e an open state, and thereafter performs a touch operation on the breaker switch 1210. Specifically, in one direction (from ON to OFF), the breaker switch 1210 is operated through the slide operation. In regard to the other direction (from OFF to ON), the breaker switch is operated only when the operator slides the breaker switch (once) while pressing the breaker switch or slides the breaker switch a designated number of times (multiple times). By providing with the breaker switch and the cover outside the breaker switch, an erroneous operation is prevented.

Figure 33:
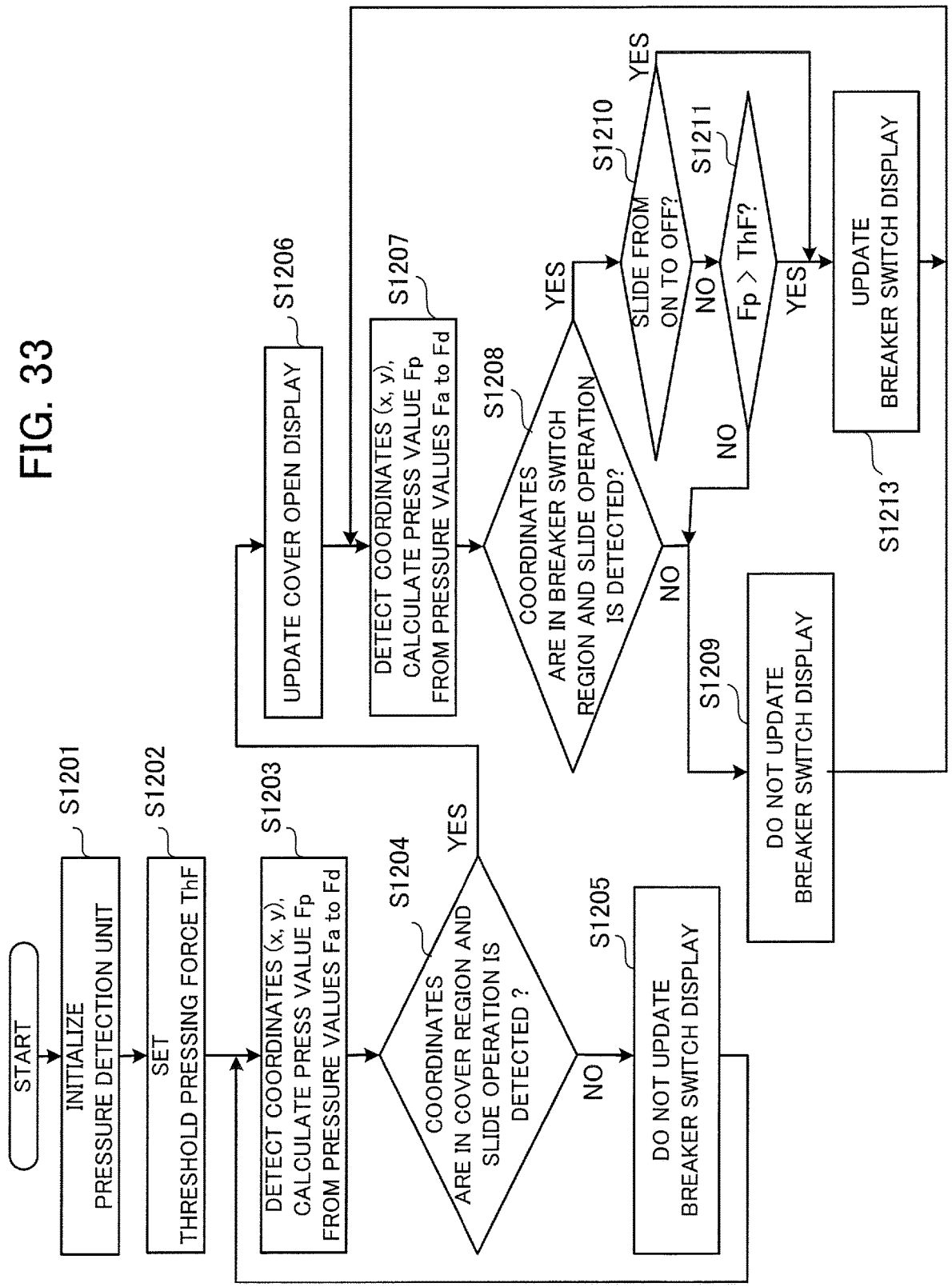
FIG. 33 is a flowchart showing the operation of the touch panel device according to the twelfth embodiment.

FIG. 33 is a flowchart showing the operation of the touch panel device 12 according to the twelfth embodiment. The processes shown in FIG. 33 include processes of steps S1203 to S1206 in addition to the processes shown in FIG. 30. Steps S1201 to S1202 and S1207 to S1213 in FIG. 33 are the same as the steps S1101 to S1108 in FIG. 30. Except for the addition of the processes of the steps S1203 to S1206, the processes shown in FIG. 33 are the same as the processes shown in FIG. 30.

In step S1204, the operation judgment unit 130 judges whether a slide operation is detected at coordinates in a cover region or not based on the coordinates detected in the step S1203.

When the result of the judgment in the step S1204 is NO, the operation judgment unit 130 returns the process to the step S1203 without updating the display of the breaker switch with the cover in step S1205.

When the result of the judgment in the step S1204 is YES, the operation judgment unit 130 in step S1206 updates the display so that the cover 1220 in the open state is displayed, and advances the process to the step S1207.

As described above, in the touch panel device according to the twelfth embodiment, by providing with the breaker switch 1210 operated easily in one direction (from ON to OFF) through the slide operation and operated in the other direction (from OFF to ON) when the slide operation is performed a designated number of times (multiple times) with pressing of a press value greater than the threshold pressing force ThF, an erroneous operation is prevented. Further, since the breaker switch can be operated only after performing the touch operation of opening the cover 1220, the occurrence of an erroneous operation in which the second touch operation is carried out against the operator's intention can be avoided.

(13) Modification

In each of the touch panel devices 1 to 12 according to the first to twelfth embodiments described above, features of the touch panel devices 1 to 12 can be appropriately combined with each other.

Further, in the touch panel devices 1 to 12, it is also possible to calculate the pressure coordinates (x, y), as coordinates to which the pressing force is applied, based on equilibrium equations of the moments of force by using the pressure values Fa to Fd outputted from the pressure sensors 30a to 30d of the pressure sensor unit 30. For example, in a case where four corner parts of the touch panel 20 having a horizontal direction size W and a vertical direction size H are supported by the pressure sensors 30a to 30d, the pressure coordinates (x, y) can be calculated from equilibrium equations of force moments in the x-axis direction and the y-axis direction. The equilibrium equations of force moments are the following equations (1) and (2), for example:

$$(Fa+Fb)x=(Fc+Fd)(W-x) \quad (1)$$

$$(Fb+Fc)y=(Fa+Fd)(H-y) \quad (2)$$

The pressure coordinates (x, y) can be calculated from the simultaneous equations (1) and (2). When the pressure coordinates can be calculated, it is also possible to use the pressure coordinates in order to check the reliability of the capacitance coordinates or in place of the capacitance coordinates.

DESCRIPTION OF REFERENCE CHARACTERS

1: touch panel device, 20: touch panel, 21: operation surface, 30: pressure sensor unit, 30a-30d: pressure sensor, 41: processor, 42: memory, 100: controller, 110: coordinate detection unit, 120: pressure detection unit, 130: operation judgment unit, 140: operation permission pressure setting unit, 210, 250, 310: slide bar, 410, 510, 610: numerical input component, 810: dial button, 910: valve, 1010: lever, 1110, 1210: breaker switch, 1220: cover.

What is claimed is:

1. A touch panel device comprising:

touch panel that has an operation surface that displays at least an operation component and changes a state of the operation component displayed on the operation surface in which a touch operation is performed;

pressure sensors to output pressure detection signals corresponding to a pressing force applied to the operation surface; and a controller to calculate coordinates of the touch operation on the operation surface based on the state of the operation component and a pressing force value detected on the operation component from the touch operation, wherein the operation component includes a dial button on which the touch operation is performed by rotating the dial button while the dial button is pressed with a pressing force at a press value by a user and the operation surface displays the state of the operation component indicating an unlocked state and an input value indicating a pressed force value detected from the touch operation, then the controller determines whether the pressing force value is greater than a predetermined threshold pressing force, in a case that the touch operation is performed on the dial button and the pressing force value is less than the predetermined threshold pressing force, and coordinates of the touch operation are within dial region of the touch operation, then the controller judges that operation information corresponding to the touch operation is valid and updates presented rotation display of the dial button and an input value reflecting the rotation operation on the operation surface, in a case that the touch operation is performed on the dial button, the pressing force value is less than the predetermined threshold pressing force, and the coordinates of the first touch operation are not within the dial button, then the controller judges that the operation information corresponding to the first touch operation is invalid and the presented rotation display of the dial button and the input value reflecting the rotation operation on the operation surface are not updated, in a case that the touch operation is performed, the pressing force value is greater than the predetermined threshold pressing force, the displayed input value is a boundary value showing an upper limit value of a normal input range, and the coordinates of the first touch operation are within the dial button, then the controller judges that the operation information corresponding to the touch operation is valid and updates the presented rotation display of the dial button and an input value reflecting the rotation operation on the operation surface, and in a case that the touch operation is performed, the pressing force value is greater than the predetermined threshold pressing force, the displayed input value is the boundary value, and the coordinates of the first touch operation are not within the dial button, then the controller judges that the operation information corresponding to the touch operation is invalid and updates the presented rotation display of the dial button and an input value reflecting the rotation operation on the operation surface.

* * * * *